(12) United States Patent
Miyake

(10) Patent No.: US 10,403,204 B2
(45) Date of Patent: Sep. 3, 2019

(54) DISPLAY DEVICE, DISPLAY MODULE, ELECTRONIC DEVICE, AND METHOD FOR DRIVING DISPLAY DEVICE

(71) Applicant: Semiconductor Energy Laboratory Co., Ltd., Atsugi-shi, Kanagawa-ken (JP)

(72) Inventor: Hiroyuki Miyake, Aichi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 10 days.

(21) Appl. No.: 15/643,702

(22) Filed: Jul. 7, 2017

(65) Prior Publication Data

US 2018/0018918 A1 Jan. 18, 2018

(30) Foreign Application Priority Data

Jul. 12, 2016 (JP) .................. 2016-137704

(51) Int. Cl.
*G09G 3/3233* (2016.01)
*G09G 3/3266* (2016.01)
(Continued)

(52) U.S. Cl.
CPC ......... *G09G 3/3233* (2013.01); *G09G 3/3266* (2013.01); *G09G 3/36* (2013.01);
(Continued)

(58) Field of Classification Search
CPC ... G09G 3/3208; G09G 3/3233; G09G 3/3258
See application file for complete search history.

(56) References Cited

U.S. PATENT DOCUMENTS 8,269,218 B2   9/2012   Yamazaki
8,471,256 B2   6/2013   Yamazaki et al.
(Continued)

FOREIGN PATENT DOCUMENTS

EP        2439724 A1    4/2012
WO   2010/140285 A1   12/2010

OTHER PUBLICATIONS

Kusunoki.K et al., "Transmissive OLED and Reflective LC Hybrid (TR-Hybrid) Display", SID Digest '16 : SID International Symposium Digest of Technical Papers, May 22, 2016, vol. 47, pp. 57-60.
(Continued)

*Primary Examiner* — William Lu
(74) *Attorney, Agent, or Firm* — Fish & Richardson P.C.

(57) ABSTRACT

Control of a light emission period of a light-emitting element results in higher visibility. A display device includes a signal line, a first scan line, a second scan line, and a pixel circuit. The pixel circuit includes a light-emitting element, a first transistor, a second transistor, a third transistor, and a capacitor. The second transistor is turned on by application of voltage that is lower than voltage applied to the first scan line to the second scan line after the second transistor is turned off by second voltage. Thus, a gate of the third transistor is controlled by the voltage applied to the second scan line. The display device has a function of controlling the light emission period by turning off the third transistor by the second scan line.

9 Claims, 20 Drawing Sheets

(51) Int. Cl.
*G09G 3/36* (2006.01)
*G06F 3/041* (2006.01)

(52) U.S. Cl.
CPC ..... *G06F 3/041* (2013.01); *G09G 2320/0233* (2013.01); *G09G 2320/0247* (2013.01); *G09G 2320/064* (2013.01); *G09G 2330/021* (2013.01); *G09G 2340/0407* (2013.01)

(56) References Cited

U.S. PATENT DOCUMENTS

| | | | |
|---|---|---|---|
| 8,502,225 B2 | 8/2013 | Yamazaki et al. | |
| 8,610,749 B2 | 12/2013 | Cishi | |
| 9,666,655 B2 | 5/2017 | Miyake | |
| 9,799,291 B2* | 10/2017 | Hung | G09G 3/3659 |
| 10,242,617 B2* | 3/2019 | Miyake | H01L 29/78648 |
| 2006/0139253 A1* | 6/2006 | Choi | G09G 3/3233 345/76 |
| 2007/0045620 A1* | 3/2007 | Park | G09G 3/3233 257/40 |
| 2008/0030446 A1* | 2/2008 | Asano | G09G 3/3233 345/87 |
| 2008/0042939 A1* | 2/2008 | Yamashita | G09G 3/3233 345/76 |
| 2008/0062103 A1* | 3/2008 | You | G09G 3/3659 345/89 |
| 2008/0238897 A1* | 10/2008 | Kimura | G09G 3/3614 345/204 |
| 2009/0033644 A1* | 2/2009 | Kawaguchi | G09G 3/3216 345/205 |
| 2010/0309230 A1* | 12/2010 | Cho | G09G 3/3413 345/690 |
| 2011/0032231 A1* | 2/2011 | Maruyama | G09G 3/2096 345/208 |
| 2011/0084947 A1* | 4/2011 | Chung | G09G 3/3233 345/211 |
| 2011/0198483 A1* | 8/2011 | Kurokawa | H01L 27/1225 250/214 R |
| 2012/0169798 A1* | 7/2012 | Ebisuno | G09G 3/325 345/690 |
| 2012/0274667 A1* | 11/2012 | Kuwayama | G09G 3/342 345/690 |
| 2013/0207102 A1 | 8/2013 | Miyake et al. | |
| 2014/0062844 A1* | 3/2014 | Yamamoto | G09G 3/3225 345/80 |
| 2014/0339543 A1 | 11/2014 | Yamazaki et al. | |
| 2014/0361290 A1 | 12/2014 | Yamazaki et al. | |
| 2016/0300900 A1 | 10/2016 | Miyake | |
| 2017/0018222 A1* | 1/2017 | Park | H01L 27/3244 |
| 2017/0032728 A1 | 2/2017 | Shima et al. | |
| 2017/0040403 A1 | 2/2017 | Kuwabara | |
| 2017/0352313 A1 | 12/2017 | Miyake | |

OTHER PUBLICATIONS

Sakuishi.T et al., "Transmissive Oled and Reflective Lc Hybrid (Tr-Hybrid) Display with High Visibility and Low Power Consumption", SID Digest '16 : SID International Symposium Digest of Technical Papers, May 22, 2016, vol. 47, pp. 735-738.

Ohide.T et al., "Application of Transfer Technology to Manufacturing of Transmissive OLED and Reflective LC Hybrid (TR-Hybrid) Display", SID Digest '16 : SID International Symposium Digest of Technical Papers, May 22, 2016, vol. 47, pp. 1002-1004.

* cited by examiner

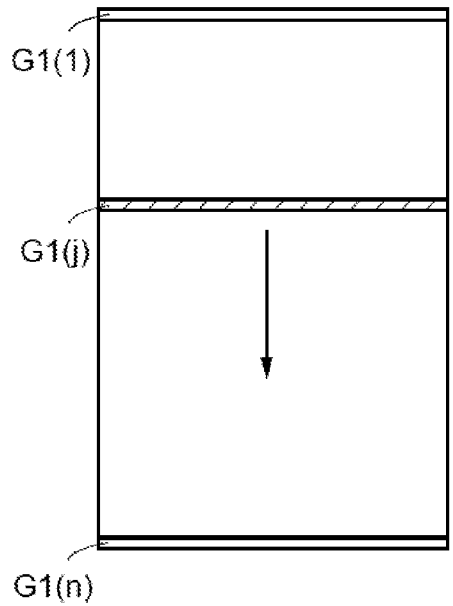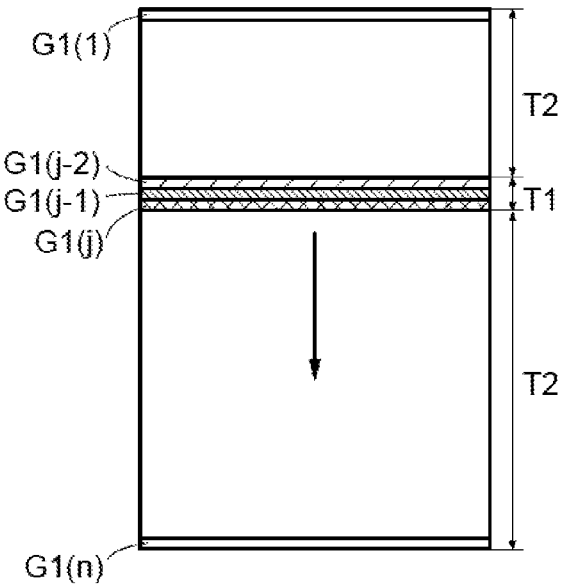

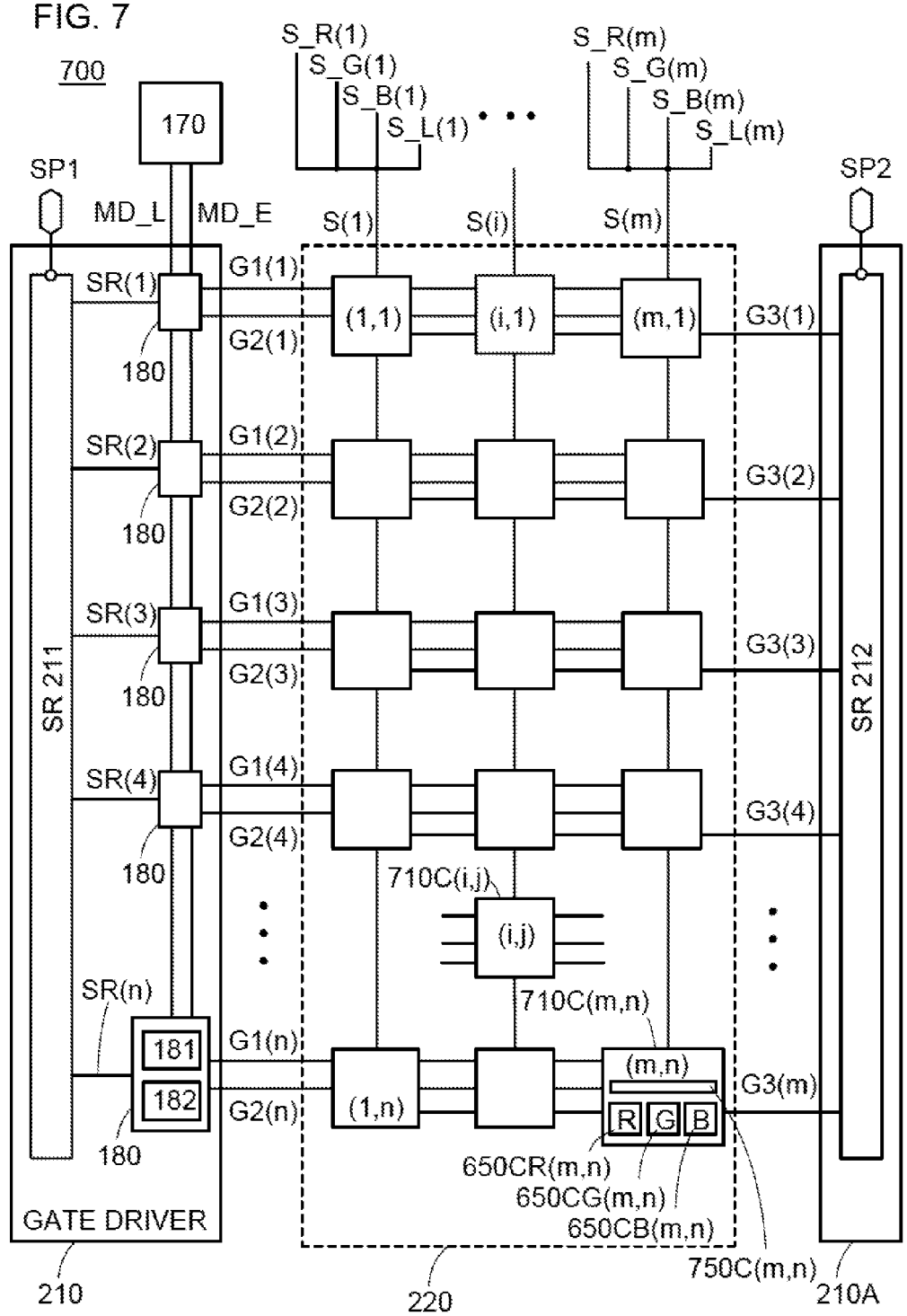

SW1,SW2,SW3,M

M1,M2,M3,SW1_1,SW2_1,SW3_1,M

TRT

FIG. 18A
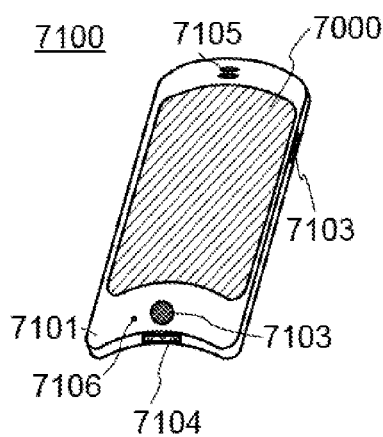
FIG. 18B
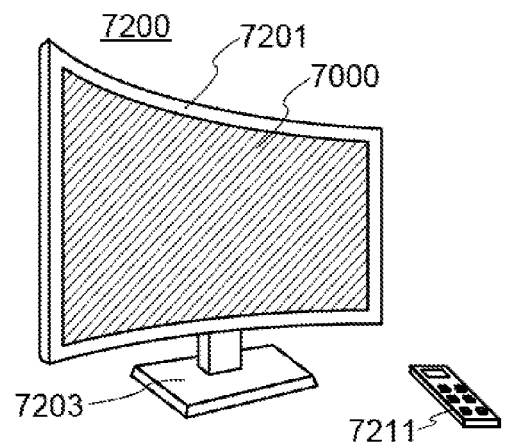
FIG. 18C1
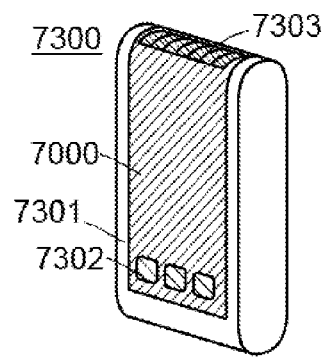
FIG. 18D
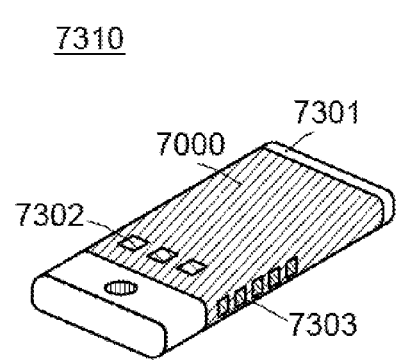
FIG. 18E
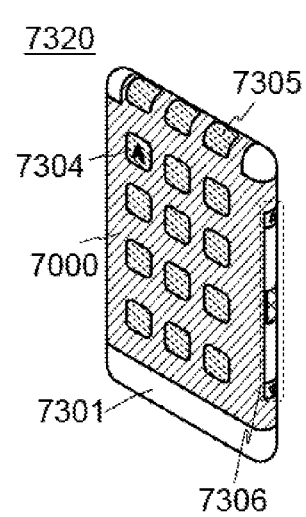
FIG. 18C2
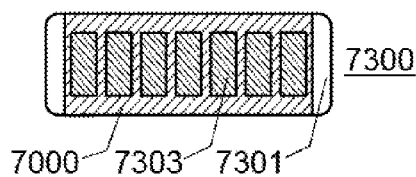

FIG. 19A1
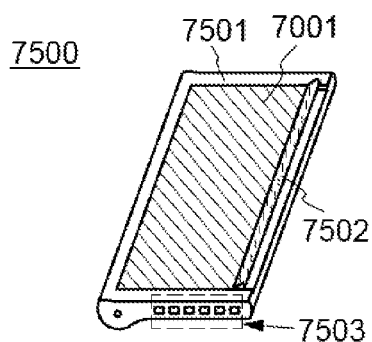
FIG. 19B
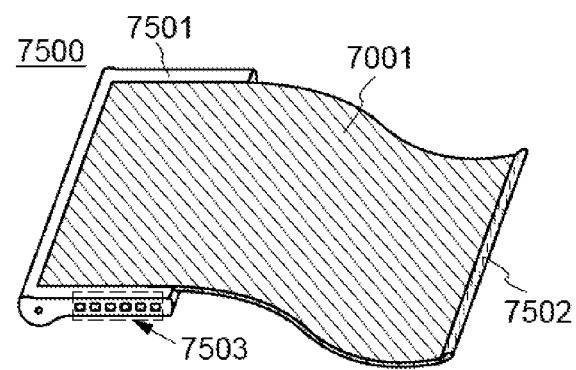
FIG. 19A2
FIG. 19C
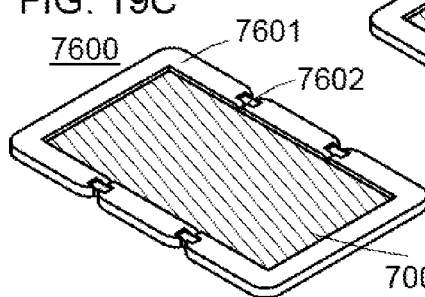
FIG. 19D
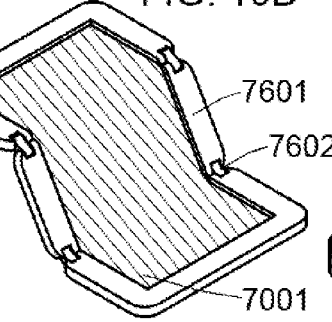
FIG. 19E
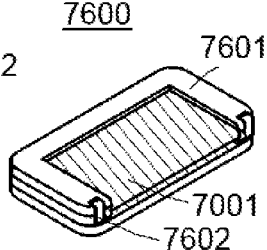
FIG. 19F
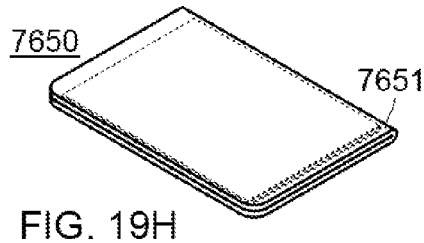
FIG. 19G
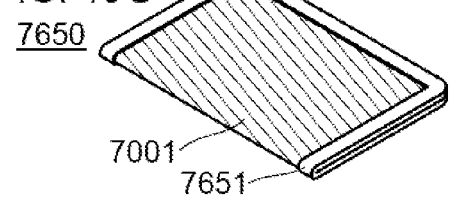
FIG. 19H
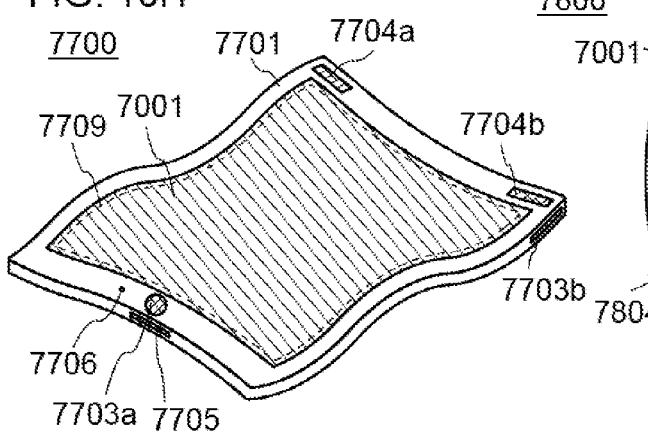
FIG. 19I
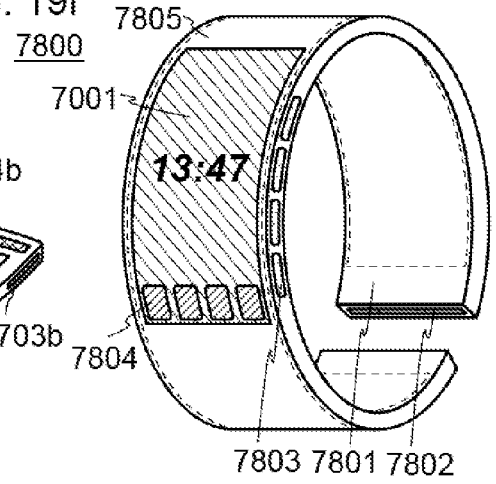

DISPLAY DEVICE, DISPLAY MODULE, ELECTRONIC DEVICE, AND METHOD FOR DRIVING DISPLAY DEVICE

BACKGROUND OF THE INVENTION

1. Field of the Invention

One embodiment of the present invention relates to a display device, a display module, and an electronic device.

Note that one embodiment of the present invention is not limited to the above technical field. The technical field of one embodiment of the invention disclosed in this specification and the like relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof.

2. Description of the Related Art

Mobile devices such as smartphones and tablets have become increasingly popular. In addition, novel devices such as head-mounted displays and digitized car-mounted display devices have been used, and high visibility and low power consumption are required.

An active-matrix organic EL display employs a hold-type display method (hereinafter referred to as hold-type driving) that features high response speed, a wide viewing angle, and the like. In hold-type driving, a light-emitting element emits light during one frame period (one frame is a unit of an image to be displayed). Luminance during one frame period is added up as emission luminance to control gradation. For example, in a display device that displays 60 frames for one second, an image is displayed 60 times for one second. In that case, one frame period is approximately 16.67 ms.

Another driving method is an impulsive display method (hereinafter referred to as impulsive driving). In impulsive driving, light is emitted during a selection period of a pixel circuit at the same luminance as total luminance during one frame period to control gradation.

Note that in hold-type driving or impulsive driving, a voltage set method where emission luminance is set by voltage and a current set method where emission luminance is set by current are known.

Although the response speed of an organic EL element is higher than that of a liquid crystal element, a moving image blur that causes a decrease in the resolution of moving images is generated in displaying moving images in hold-type driving. The resolution of moving images refers to visual resolution in displaying moving images and resolution that is perceived by a person in displaying moving images. For example, the resolution of moving images refers to the limiting resolution at which the updating interval of images can be recognized in the case where a wedged figure is scrolled on a screen.

For example, in Patent Document 1, a control method for increasing visibility by controlling gradation and inserting a black frame between display frames with a combination of impulsive driving and hold-type driving has been proposed.

REFERENCE

Patent Document

Patent Document 1: PCT International Publication No. 2010/140285

SUMMARY OF THE INVENTION

In hold-type driving, a moving image blur is generated in a display region owing to an active-matrix display; thus, there is a problem in that the edge of a displayed moving image or the like becomes unclear, for example.

In hold-type driving, total luminance is used because display is updated every frame. Thus, in order to recognize the change in gradation, a period when luminance is integrated is needed. As a result, contrast is not increased.

Dot-sequential impulsive driving can suppress a moving image blur generated in hold-type driving; however, a flicker is generated when a still image or the like is displayed because a light emission period is short.

In dot-sequential impulsive driving, a driver needs high current supply capability so that light is emitted during a selection period of a pixel circuit at the same luminance as total luminance during one frame period.

In view of the above problems, an object of one embodiment of the present invention is to provide a display device with a novel structure. Another object of one embodiment of the present invention is to provide a display device with increased visibility of display. Another object of one embodiment of the present invention is to provide a low-power display device.

Note that the objects of one embodiment of the present invention are not limited to the above objects. The above objects do not disturb the existence of other objects. The other objects are not described above and will be described below. The other objects will be apparent from and can be derived from the description of the specification, the drawings, and the like by those skilled in the art. One embodiment of the present invention achieves at least one of the above objects and/or the other objects.

One embodiment of the present invention is a display device that includes a signal line, a first scan line, a second scan line, and a pixel circuit. The pixel circuit includes a light-emitting element, a first transistor, a second transistor, a third transistor, and a capacitor. A gate of the first transistor is electrically connected to the first scan line. One of a source and a drain of the first transistor is electrically connected to the signal line. The other of the source and the drain of the first transistor is electrically connected to one of a source and a drain of the third transistor. A gate of the second transistor is electrically connected to the first scan line. One of a source and a drain of the second transistor is electrically connected to the second scan line. The other of the source and the drain of the second transistor is electrically connected to a gate of the third transistor. One electrode of the capacitor is electrically connected to the gate of the third transistor. The other electrode of the capacitor is electrically connected to the one of the source and the drain of the third transistor. The one of the source and the drain of the third transistor is electrically connected to the one electrode of the light-emitting element. The first scan line has a function of outputting first voltage and second voltage lower than the first voltage. The second scan line has a function of outputting third voltage and fourth voltage lower than the third voltage. The second transistor is turned on by application of the fourth voltage to the second scan line even after the second transistor is turned off by the second voltage. The third transistor is turned off by application of the fourth voltage to the gate of the third transistor.

In the above embodiment, the first to third transistors each preferably include an oxide semiconductor in a channel formation region.

In the above embodiment, the light-emitting element preferably includes an organic compound layer.

One embodiment of the present invention is a method for driving a display device that includes a display portion and a gate driver. The display portion includes a plurality of signal lines, a plurality of first scan lines, a plurality of second scan lines, a first pixel circuit, and a second pixel circuit. The first pixel circuit and the second pixel circuit each include a light-emitting element, a first transistor, a second transistor, a third transistor, and a capacitor. The gate driver is electrically connected to the plurality of first scan lines and the plurality of second scan lines. The first scan line is electrically connected to gates of the first transistor and the second transistor included in the first pixel circuit and gates of the first transistor and the second transistor included in the second pixel circuit. The second scan line is electrically connected to one of a source and a drain of the second transistor included in the first pixel circuit and one of a source and a drain of the second transistor included in the second pixel circuit. The gate driver has a function of outputting a first scan signal to the plurality of first scan lines. The gate driver has a function of outputting a second scan signal to the plurality of second scan lines. A first period and a second period are included in one frame period. In the first period, light emission and gradation of the light-emitting element are controlled. In the second period, turning-off of the light-emitting element is controlled.

In the above embodiment, the method for driving a display device includes the second period after the first period. The first scan signal preferably has a function of applying fifth voltage and sixth voltage lower than the fifth voltage. The second scan signal preferably has a function of applying seventh voltage and eighth voltage lower than the seventh voltage. In the first period, preferably, the fifth voltage is applied by the first scan signal; the signal line inputs a signal to one electrode of the capacitor through the first transistor; the second scan signal applies the seventh voltage to the other electrode of the capacitor through the second transistor; the same voltage as a potential difference applied between the electrodes of the capacitor is applied between a source and a gate of the third transistor; current based on the potential difference is input to the light-emitting element; and light emission and gradation are controlled by input of the current to the light-emitting element. In the second period, preferably, the first transistor and the second transistor are turned off when the sixth voltage is applied to the first scan signal; the second scan signal applies the eighth voltage lower than the sixth voltage; the second transistor is turned on when voltage lower than voltage of the gate of the second transistor is applied to the source of the second transistor; the third transistor is turned off when the eighth voltage is applied to the gate of the third transistor through the second transistor; and a light emission period is controlled by turning off the light-emitting element.

A display portion included in a display device in one embodiment of the present invention includes a first display region, a second display region, a plurality of first scan lines, a plurality of second scan lines, a plurality of third scan lines, and a plurality of pixels. The first display region and the second display region have a function of displaying different images. The first display region and the second display region have a function of displaying an image in a region overlapping with each other. The first scan line has a function of updating display in a pixel included in the first display region so that light is emitted in the first display region. The second scan line has a function of updating display of in a pixel included in the second display region so that light is emitted in the second display region. The third scan line has a function of shutting off the display of in the pixel included in the second display region. The first display region has a function of maintaining an image to be displayed and emitting light in one frame period. The second display region has a function of maintaining an image to be displayed and selecting a light emission time in one frame period.

In the above embodiment, the display portion preferably includes the first display region and the second display region. The display portion preferably includes the pixel. The pixel preferably includes a pixel circuit including a liquid crystal element and a plurality of subpixel circuits each including a light-emitting element. The liquid crystal element preferably has a function of displaying an image in the first display region. The light-emitting element preferably has a function of displaying an image in the second display region. The first display region is preferably formed to surround the second display region.

Each of the above embodiments is preferably a display module that includes the display device and a touch sensor.

One embodiment of the present invention can provide a display device with a novel structure. Another object of one embodiment of the present invention can provide a display device with increased visibility of display. Another object of one embodiment of the present invention can provide a low-power display device.

Note that the effects of one embodiment of the present invention are not limited to the above effects. The above effects do not disturb the existence of other effects. The other effects are not described above and will be described below. The other effects will be apparent from and can be derived from the description of the specification, the drawings, and the like by those skilled in the art. One embodiment of the present invention has at least one of the above effects and/or the other effects. Accordingly, one embodiment of the present invention does not have the above effects in some cases.

BRIEF DESCRIPTION OF THE DRAWINGS

In the accompanying drawings:

FIGS. 5A and 5B each illustrate an example of display;

FIG. 7 illustrates the structure of a display device;

FIGS. 18A, 18B, 18C1, 18C2, 18D, and 18E each illustrate an example of an electronic device;

FIGS. 19A1, 19A2, 19B, 19C, 19D, 19E, 19F, 19G, 19H, and 19I each illustrate a structure example of an electronic device.

DETAILED DESCRIPTION OF THE INVENTION

Figure 1:
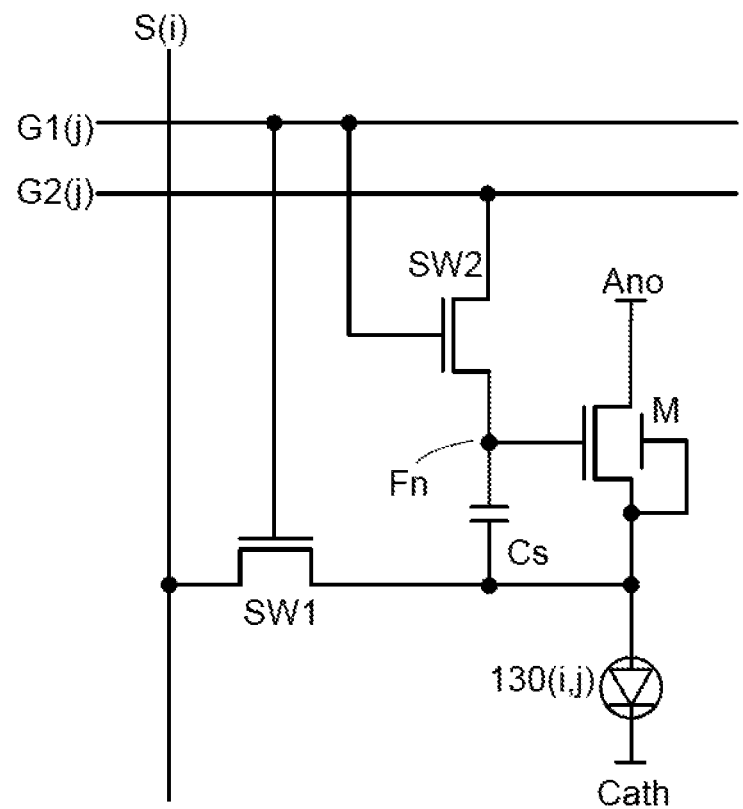
FIG. 1 illustrates the structure of a pixel circuit.

Embodiments will be described below with reference to drawings. However, the embodiments can be implemented with various modes. It will be readily appreciated by those skilled in the art that modes and details can be changed in various ways without departing from the spirit and scope of the present invention. The present invention therefore should not be construed as being limited to the following description of the embodiments.

In the drawings, the size, the layer thickness, or the region is exaggerated for clarity in some cases. Thus, embodiments of the present invention are not limited to such scales. The drawings are schematic views showing ideal examples, and embodiments of the present invention are not limited to shapes or values shown in the drawings.

In this specification, ordinal numbers such as "first", "second", and "third" are used in order to avoid confusion among components, and do not limit the number of components.

In this specification, terms for describing arrangement, such as "over," "above," "under," and "below" are used for convenience for describing the positional relationship between components with reference to drawings. Furthermore, the positional relationship between components is changed as appropriate in accordance with a direction in which each component is described. Thus, there is no limitation on terms used in this specification, and description can be made appropriately depending on the situation.

In this specification and the like, a transistor is an element having at least three terminals of a gate, a drain, and a source. The transistor has a channel region between a drain (a drain terminal, a drain region, or a drain electrode) and a source (a source terminal, a source region, or a source electrode), and current can flow between the source and the drain through the channel region. Note that in this specification and the like, a channel region refers to a region through which current mainly flows.

Furthermore, the functions of a source and a drain might be switched when transistors having different polarities are employed or the direction of current flow is changed in circuit operation, for example. Therefore, the terms "source" and "drain" can be interchanged in this specification and the like.

In this specification and the like, the term "parallel" indicates that an angle formed between two straight lines is greater than or equal to −10° and less than or equal to 10°, and accordingly also includes the case where an angle is greater than or equal to −5° and less than or equal to 5°. The term "perpendicular" indicates that an angle formed between two straight lines is greater than or equal to 80° and less than or equal to 100°, and accordingly also includes the case where an angle is greater than or equal to 85° and less than or equal to 95°.

In this specification and the like, the terms "film" and "layer" can be interchanged with each other. For example, the term "conductive layer" can be changed into the term "conductive film" in some cases. Moreover, the term "insulating film" can be changed into the term "insulating layer" in some cases.

Unless otherwise specified, off-state current in this specification and the like refers to drain current of a transistor in an off state (also referred to as a non-conduction state or a cutoff state). Unless otherwise specified, the off state of an n-channel transistor means that voltage between its gate and source (Vgs: gate-source voltage) is lower than the threshold voltage $V_{th}$, and the off state of a p-channel transistor means that the gate-source voltage Vgs is higher than the threshold voltage $V_{th}$. For example, the off-state current of an n-channel transistor sometimes refers to drain current that flows when the gate-source voltage Vgs is lower than the threshold voltage $V_{th}$.

The off-state current of a transistor depends on Vgs in some cases. Thus, "the off-state current of a transistor is lower than or equal to I" means "there is Vgs with which the off-state current of a transistor becomes lower than or equal to I" in some cases. Furthermore, "the off-state current of a transistor" means "off-state current in an off state at predetermined Vgs," "off-state current in an off state at Vgs in a predetermined range," "off-state current in an off state at Vgs with which sufficiently reduced off-state current is obtained," or the like in some cases.

As an example, assumption is made of an n-channel transistor where the threshold voltage $V_{th}$ is 0.5 V and drain current is $1\times10^{-9}$ A at Vgs of 0.5 V, $1\times10^{-13}$ A at Vgs of 0.1 V, $1\times10^{-19}$ A at Vgs of −0.5 V, and $1\times10^{-22}$ A at Vgs of −0.8 V. The drain current of the transistor is lower than or equal to $1\times10^{-19}$ A at Vgs of −0.5 V or at Vgs in the range of −0.8 V to −0.5 V; thus, it might be said that the off-state current of the transistor is lower than or equal to $1\times10^{-19}$ A. Since there is Vgs at which the drain current of the transistor is lower than or equal to $1\times10^{-22}$ A, it might be said that the off-state current of the transistor is lower than or equal to $1\times10^{-22}$ A.

In this specification and the like, the off-state current of a transistor with a channel width W is sometimes represented by a current value in relation to the channel width W or by a current value per given channel width (e.g., 1 μm). In the latter case, the off-state current might be expressed in the unit with the dimension of current per length (e.g., A/μm).

The off-state current of a transistor depends on temperature in some cases. Unless otherwise specified, the off-state current in this specification might be off-state current at room temperature, 60° C., 85° C., 95° C., or 125° C. Alternatively, the off-state current might be off-state current at a temperature at which reliability required in a semiconductor device or the like including the transistor is ensured or a temperature at which the semiconductor device or the like including the transistor is used (e.g., temperature in the range of 5° C. to 35° C.). The description "off-state current of a transistor is lower than or equal to I" might refer to a situation where there is Vgs at which the off-state current of a transistor is lower than or equal to I at room temperature, 60° C., 85° C., 95° C., 125° C., temperature at which reliability required in a semiconductor device or the like including the transistor is ensured, or temperature at which the semiconductor device or the like including the transistor is used (e.g., temperature in the range of 5° C. to 35° C.).

The off-state current of a transistor depends on voltage Vds between its drain and source in some cases. Unless otherwise specified, the off-state current in this specification might be off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current might be off-state current at Vds at which reliability required in a semiconductor device or the like including the transistor is ensured or Vds at which the semiconductor device or the like including the transistor is used. The description "off-state current of a transistor is lower than or equal to I" might refer to a situation where there is Vgs at which the off-state current of a transistor is lower than or equal to I at Vds of 0.1 V, 0.8 V, 1 V, 1.2 V, 1.8 V, 2.5 V, 3 V, 3.3 V, 10 V, 12 V, 16 V, or 20 V, Vds at which reliability required in a semiconductor device or the like including the transistor is ensured, or Vds at which the semiconductor device or the like including the transistor is used.

In the above description of off-state current, a drain may be replaced with a source. That is, the off-state current sometimes refers to current that flows through a source when a transistor is off.

In this specification and the like, the term "leakage current" sometimes expresses the same meaning as off-state current. In addition, in this specification and the like, the off-state current sometimes refers to current that flows between a source and a drain when a transistor is off, for example.

Note that voltage refers to a difference between potentials of two points, and a potential refers to electrostatic energy (electric potential energy) of a unit electric charge at a given point in an electrostatic field. In general, a difference between a potential of one point and a reference potential (e.g., a ground potential) is merely called a potential or voltage, and a potential and voltage are used as synonyms in many cases. Thus, in this specification, a potential may be rephrased as voltage and voltage may be rephrased as a potential unless otherwise specified.

Embodiment 1

In this embodiment, a display device that has a function of controlling display by supply of a signal from a scan line electrically connected to one of a source and a drain of a transistor included in a pixel circuit is described with reference to FIG. 1, FIG. 2, FIG. 3, FIG. 4, and FIGS. 5A and 5B.

Figure 3:
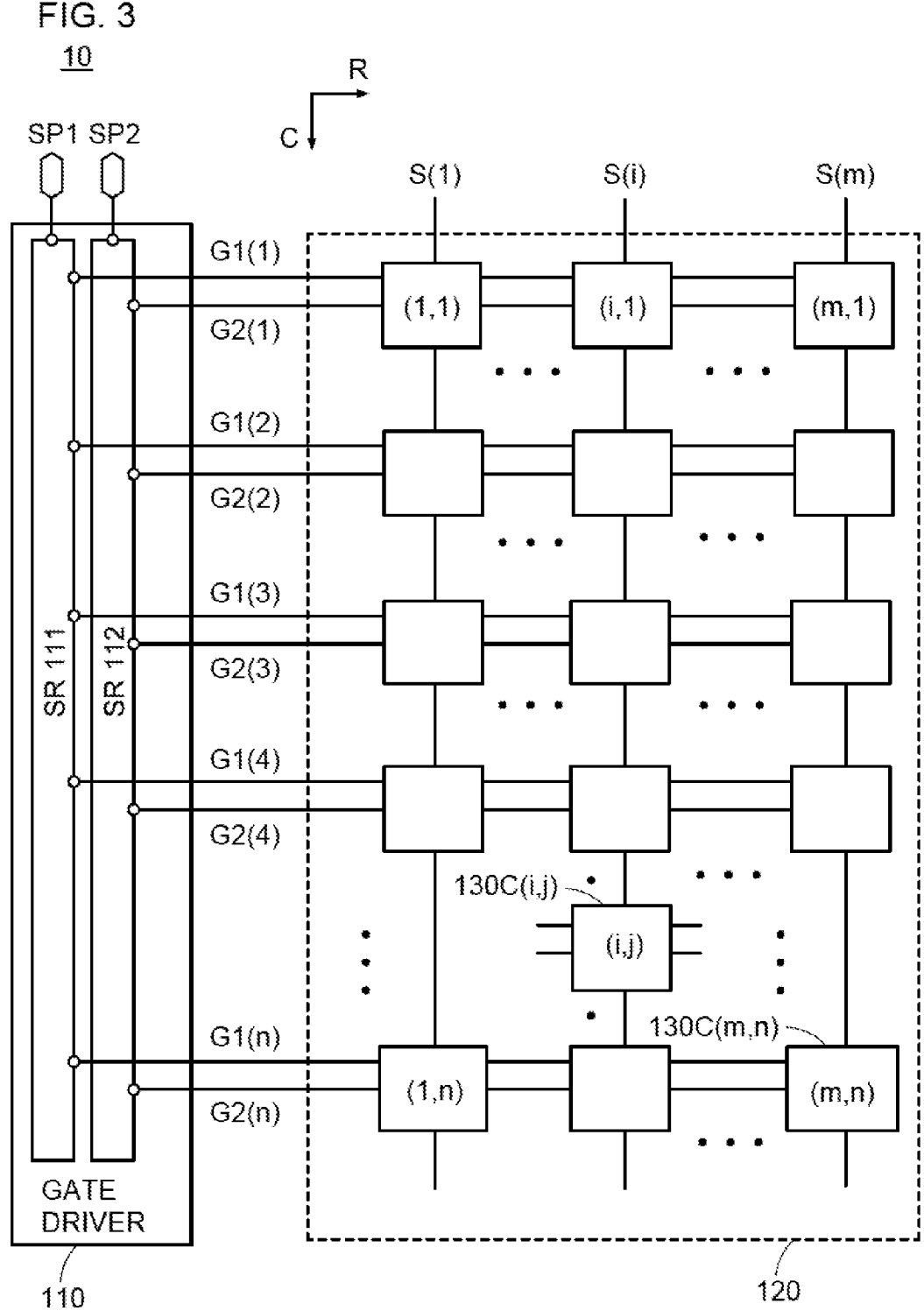
FIG. 3 illustrates the structure of a display device.

FIG. 1 illustrates the structure of a pixel circuit $130C(i,j)$. FIG. 3 is a block diagram illustrating the structure of a display device 10. One pixel circuit in a display portion 120 of the display device 10 in FIG. 3 is described as the pixel circuit $130C(i,j)$. The display portion 120 includes m (column direction)×n (row direction) pixel circuits in a matrix, where m is an integer greater than or equal to 1 and n is an integer greater than or equal to 1. Note that i is an integer greater than or equal to 1 and less than or equal to m, and j is an integer greater than or equal to 1 and less than or equal to n.

The pixel circuit $130C(i,j)$ includes a light-emitting element $130(i,j)$. For example, the light-emitting element $130(i,j)$ is preferably a light-emitting element that is driven by direct current. Gradation of the light-emitting element $130(i,j)$ is controlled by a signal based on voltage or current.

The pixel circuit $130C(i,j)$ includes a transistor SW1, a transistor SW2, a transistor M, a capacitor Cs, and the light-emitting element $130(i,j)$.

The light-emitting element $130(i,j)$ includes a pixel electrode, a counter electrode, and an organic compound layer positioned between the pixel electrode and the counter electrode. The pixel electrode is one of an anode and a cathode, and the counter electrode is the other of the anode and the cathode. The organic compound layer includes a light-emitting layer.

A gate of the transistor SW1 included in the pixel circuit $130C(i,j)$ is electrically connected to a scan line $G1(j)$. One of a source and a drain of the transistor SW1 is electrically connected to a signal line $S(i)$. The other of the source and the drain of the transistor SW1 is electrically connected to one of a source and a drain of the transistor M, one electrode of the capacitor Cs, and the pixel electrode.

A gate of the transistor SW2 is electrically connected to the scan line $G1(j)$. One of a source and a drain of the transistor SW2 is electrically connected to a scan line $G2(j)$. The other of the source and the drain of the transistor SW2 is electrically connected to a gate of the transistor M and the other electrode of the capacitor Cs. A node where the other of the source and the drain of the transistor SW2, the gate of the transistor M, and the other electrode of the capacitor Cs are connected is referred to as a floating node Fn (hereinafter referred to as Fn).

Anode voltage is applied to the other of a source and a drain of the transistor M through an Ano terminal. The pixel electrode is electrically connected to the one of the source and the drain of the transistor M. The pixel electrode is connected to the counter electrode through the light-emitting element $130(i,j)$. The counter electrode is electrically connected to a Cath terminal.

The transistor M includes a first gate and a second gate. In this specification, a first gate is simply referred to as a gate, and a second gate is referred to as a back gate in some cases. The back gate of the transistor M is electrically connected to at least one of the gate, the source, and the drain of the transistor M. The gate and the back gate of the transistor M preferably have an overlap region with a channel formation region positioned therebetween.

In the transistor M, the channel formation region can be electrically surrounded by electric fields from a gate electrode (first gate electrode) and a back gate electrode (second gate electrode). This device structure is referred to as a surrounded channel (s-channel) structure.

Drive current of the light-emitting element $130(i,j)$ is controlled by the voltage of a signal (hereinafter referred to as signal voltage) supplied from the signal line $S(i)$. The magnitude of the drive current represents gradation of the light-emitting element $130(i,j)$.

Figure 2:
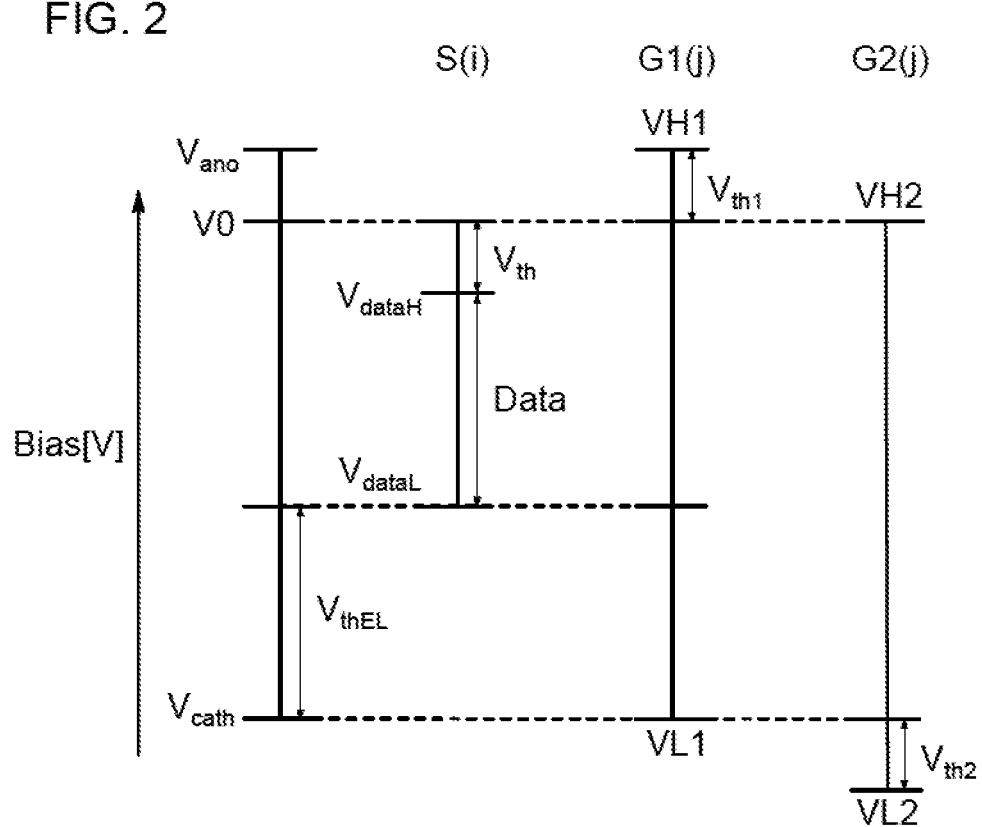
FIG. 2 illustrates potential relationship of signals in FIG. 1.

FIG. 2 illustrates potential relationship in FIG. 1. First, signal voltage is applied to the signal line $S(i)$. The signal voltage ranges from the highest voltage $V_{dataH}$ to the lowest voltage $V_{dataL}$. First voltage VH1 (hereinafter referred to as VH1) applied to the scan line $G1(j)$ is preferably higher than the sum of $V_{dataH}$, threshold voltage $V_{th}$ of the transistor M, and threshold voltage $V_{th1}$ of the transistor SW1.

Second voltage VL1 (hereinafter referred to as VL1) applied to the scan line $G1(j)$ is preferably lower than or equal to voltage obtained by subtraction of threshold voltage $V_{thEL}$ of the light-emitting element from $V_{dataL}$. Here, VL1 is preferably equal to or lower than cathode voltage ($V_{cath}$).

Gradation of the light-emitting element is controlled by direct current; thus, current is needed to emit light with the minimum gradation. Voltage that is needed to feed current that contributes to light emission is calculated as threshold voltage $V_{dataL}$ from electrical characteristics of the light-emitting element.

Third voltage VH2 (hereinafter referred to as VH2) applied to the scan line G2(j) is preferably higher than or equal to the sum of $V_{dataH}$ and the threshold voltage $V_{th}$ of the transistor M. VH2 may be used as reference potential V0 because VH2 is a reference potential when signal voltage is written to the capacitor Cs from the signal line S(i). In the following description, a scan signal VH2 and the reference potential V0 have the same voltage. The signal voltage is written to the capacitor Cs to make a potential difference between the source and the gate of the transistor M. The transistor M supplies current based on a potential difference of the capacitor Cs to the light-emitting element to control gradation.

Since the reference potential V0 is a reference potential with respect to the signal voltage, VH2 and V0 may be different voltages and different wirings may be used. However, the number of wirings can be reduced when VH2 of the scan line G2(j) and V0 have the same potential. When flexibility of layout in a pixel circuit is increased and the number of wirings is reduced, parasitic capacitance generated at a wiring intersection can also be reduced. Drive load can be reduced by a reduction in parasitic capacitance of scan lines, so that the buffer size of a gate driver can be decreased. A high-definition display device can be provided when different wirings are used for VH2 and V0.

Fourth voltage VL2 is applied to the scan line G2(j). VL2 is preferably lower than or equal to threshold voltage $V_{th2}$ of the transistor SW2.

Anode voltage ($V_{ano}$) is preferably higher than the reference potential V0 to control gradation in a saturation region of the transistor M.

Next, operation in FIG. 1 is described with reference to the potential relationship in FIG. 2. First, operation of the light-emitting element in a light emission period as a first period is described. VH1 is applied to the scan line G1(j); a scan line in a j-th row is selected; and VH2 is applied to the scan line G2(j). Thus, the transistors SW1 and SW2 are turned on. VH2 is applied to Fn through the transistor SW2.

Signal voltage is applied to the one electrode of the capacitor Cs from the signal line S(i) through the transistor SW1. The signal voltage is retained with reference to V0 applied to Fn electrically connected to the other electrode of the capacitor Cs. The signal voltage retained in the capacitor Cs is applied between the source and the gate of the transistor M, and current based on the signal voltage flows to the light-emitting element, so that gradation can be obtained.

Next, VL1 is applied to the scan line G1(j), and the scan line in the j-th row is unselected. The transistor SW1 is turned off. The scan line G2(j) retains VH2; thus, each of the source and the drain of the transistor SW2 has VH2. The transistor SW2 is turned off because VL1 is applied to the gate of the transistor SW2. Therefore, Fn retains V0; current supplied from the transistor M is retained; and gradation is also retained.

Next, VL1 is applied to the scan line G1(j), and VL2 is applied to the scan line G2(j). VL1 is applied to the gate of the transistor SW2, and VL2 lower than VL1 is applied to the source of the transistor SW2 from the scan line G2(j), so that the transistor SW2 is forcibly turned on. Thus, the voltage of Fn is changed into VL2. The transistor M is turned off when VL2 lower than the lowest voltage $V_{dataL}$ applied to the source of the transistor M is applied to the gate of the transistor M. Accordingly, current cannot be supplied from the transistor M to the light-emitting element, and the light-emitting element terminates light emission.

A period when VH2 is applied to the scan line G2(j) is a light emission period. The light emission period can be controlled in accordance with an image or gradation to be displayed.

The display device 10 in FIG. 3 includes a gate driver 110 and the display portion 120. The gate driver 110 includes a shift register circuit 111 and a shift register circuit 112. The display portion 120 includes pixel circuits 130C(1,1) to 130C(m,n).

The display portion 120 described in this embodiment includes the pixel circuits 130C(1,1) to 130C(m,n), first scan lines G1(1) to G1(n), second scan lines G2(1) to G2(n), and signal lines S(1) to S(m).

Figure 4:
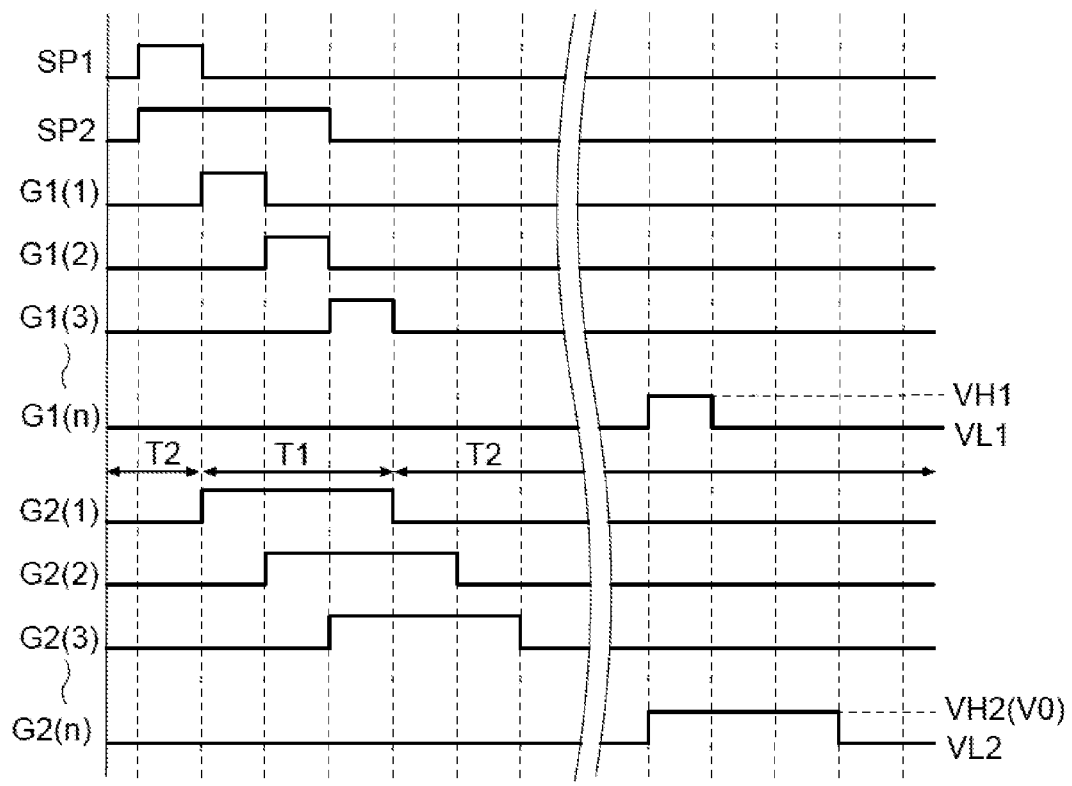
FIG. 4 is a timing chart showing an operation example of a display device.

FIG. 4 is a timing chart of the display device 10 that includes the transistor illustrated in FIG. 3. The gate driver 110 controls the pixel circuit 130C(i,j) by two input signals of a start pulse SP1 and a start pulse SP2.

The start pulse SP1 is input to the shift register circuit 111. The shift register circuit 111 outputs a signal that controls the scan line G1(1) to sequentially select the scan lines G1(1) to G1(n) and update display.

The start pulse SP2 is input to the shift register circuit 112. The shift register circuit 112 outputs a signal that controls the scan line G2(1) to sequentially select the scan lines G2(1) to G2(n) and control whether to display an image.

The signal of the scan line G1 selected by the start pulse SP1 is input to the gate of the transistor SW1 included in the pixel circuit 130C(i,j), so that the signal voltage supplied from the signal line S(i) is applied to the one electrode of the capacitor Cs. The signal voltage retained between the electrodes of the capacitor Cs is equal to voltage between the gate and the source of the transistor M, and the light-emitting element 130(i,j) emits light in accordance with the signal voltage.

The start pulse SP2 has a function of forcibly turning on the transistor SW2 included in the pixel circuit 130C(i,j) by controlling the voltage of the scan line G2(j), and can turn off the transistor M by changing the voltage of Fn into VL2. Therefore, the light emission period can be controlled by the scan line G2. In a period T2, the light-emitting element 130(i,j) does not emit light owing to the signal of the scan line G2. Hold-type driving is employed when a still image is displayed; thus, the start pulse SP2 may be fixed to VH2.

FIGS. 5A and 5B are described. FIG. 5A illustrates an example in which display is performed by input of signals with the same pulse width to the start pulse SP1 and the start pulse SP2. First, the display is updated by G1(j). At the timing when the next scan line G1(j+1) is selected, the signal voltage of G2(j) is lower than the voltage of the source of the transistor M. In a region selected by G1(j) where light has been emitted, light emission is terminated.

FIG. 5B illustrates display when driving is performed in accordance with the timing chart in FIG. 4. Light is emitted in a display region corresponding to the scan lines G1(j), G1(j−1), and G1(j−2) in FIG. 5B, and light emission is terminated in other regions. In the light emission period, the display region is explicitly illustrated by hatching. Hold-type driving updates the display of a pixel circuit selected by the scan line. The light-emitting element emits light for one frame period. In contrast, the use of the pixel circuit in FIG. 1 can update display by line-sequential impulsive driving.

Therefore, a period when the light-emitting element emits light and display is performed is controlled by the start pulse SP2. By making the signal width of the start pulse SP2 variable, when display speed is high, for example, a moving image is displayed, moving image resolution can be improved by the decrease in the light emission period. In addition, total luminance can be secured by suppressing emission luminance by the increase in the light emission period when display speed is low, for example, a still image is displayed. Thus, power consumption can be reduced. The light emission period in line-sequential impulsive driving is longer than that in dot-sequential impulsive driving, and total luminance becomes higher; thus, a flicker can be reduced and visibility can be improved.

Furthermore, the pulse width of the start pulse SP2 may be determined depending on a status detected by a battery monitor of a mobile device. The light emission period in FIG. 5A is shorter than that in FIG. 5B. Therefore, in order to achieve the same display quality, it is necessary to increase the voltage of the signal supplied from the signal line S(i) in consideration of total luminance. In order to reduce power consumption, the voltage of the signal is preferably low. The power consumption can be reduced and optimum display quality can be provided by optimization of the signal width of the start pulse SP2 depending on the battery charge condition.

In a display device that displays 60 frames for one second, there is a method for improving moving image resolution by intentional insertion of a black frame between continuous display frames. For example, when a black frame is inserted, it is necessary to set the number of frames to be displayed more than 60 frames by the number of black frames to be inserted for one second in order to maintain the display quality.

The use of the pixel circuit in FIG. 1 can control the light emission period and a turn-off period in one frame period. Therefore, the display can be controlled by line-sequential impulsive driving. Furthermore, moving image resolution is improved by impulsive driving, so that visibility can be improved.

There is no particular limitation on device structures of various elements such as transistors and capacitors used in the display device 10 described in this embodiment. Device structures are selected to be suited for the functions of the pixel circuit 130C(i,j) included in the display portion 120 and the gate driver 110. Examples of the device structure of a transistor are a top-gate structure, a bottom-gate structure, a dual-gate structure provided with both a gate (front gate) and a bottom gate, and a multi-gate structure including a plurality of gate electrodes for one semiconductor layer. There is no particular limitation on types (e.g., a composition and a crystal structure) of a semiconductor contained in a semiconductor layer (channel formation region) of a transistor. A semiconductor used for the semiconductor layer is roughly divided into a single crystal semiconductor and a non-single-crystal semiconductor. Examples of a non-single-crystal semiconductor include a polycrystalline semiconductor, a microcrystalline semiconductor, and an amorphous semiconductor. Examples of a semiconductor material include a semiconductor containing one or more kinds of Group 14 elements such as Si, Ge, or C (e.g., silicon, silicon germanium, and silicon carbide), an oxide semiconductor, and a compound semiconductor such as gallium nitride.

In the example of the pixel circuit 130C(i,j) in FIG. 1, the transistor SW1, the transistor SW2, and the transistor M are n-channel transistors and an oxide semiconductor is used for each semiconductor layer. Each of the transistor SW1 and the transistor SW2 is a bottom-gate transistor, and the transistor M is a dual-gate transistor that includes a back gate.

In the case where the transistor SW1, the transistor SW2, and the transistor M are oxide semiconductor transistors, the oxide semiconductor transistors can have low current in an off-state (off-state current). Thus, an electrical signal such as an image signal can be held for a longer period, and a writing interval can be set longer in an on state. Accordingly, the frequency of refresh operation can be reduced, which suppresses power consumption.

The structures and methods described in this embodiment can be combined as appropriate with any of the structures and methods described in the other embodiments.

Embodiment 2

In this embodiment, a display device that includes a first pixel circuit including a first display element or a second pixel circuit including a second display element is described with reference to FIG. 6, FIG. 7, FIGS. 8A and 8B, FIGS. 9A and 9B, and FIGS. 10A to 10D. The circuit described in FIG. 1 is used as the second pixel circuit including the second display element.

Figure 6:
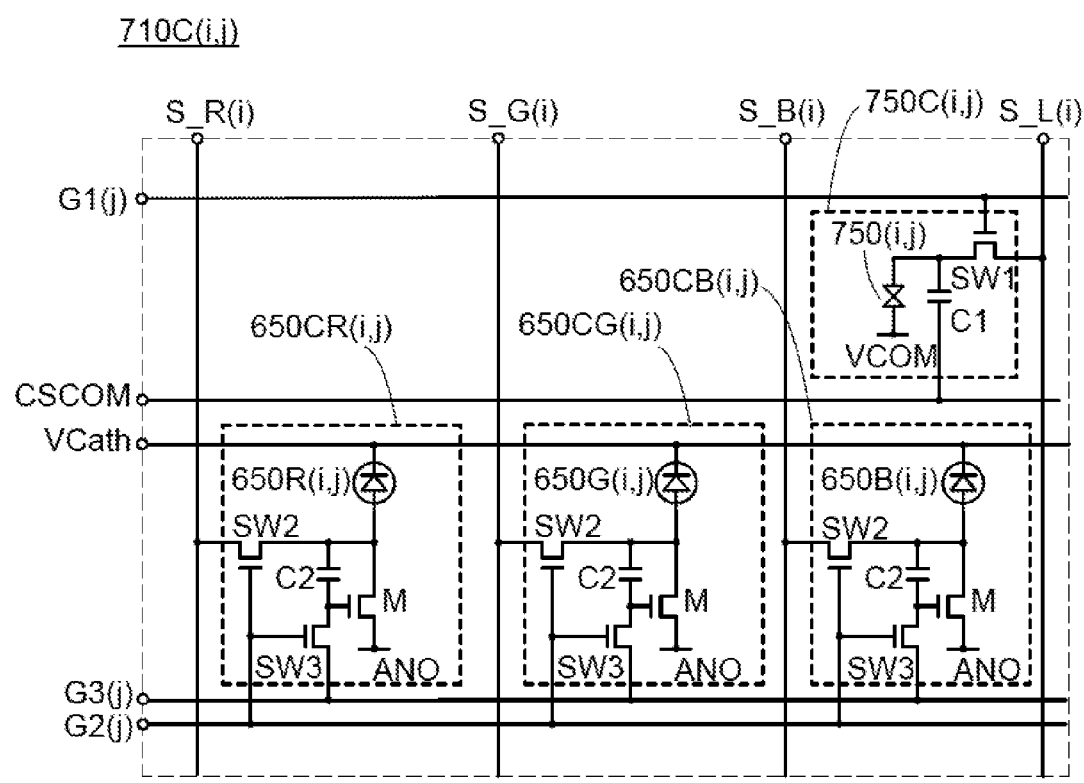
FIG. 6 illustrates the structure of a pixel circuit.

One pixel included in a display portion 220 of a display device 700 in FIG. 7 is described as a pixel circuit 710C(i,j) in FIG. 6. The display portion 220 includes m (column direction)×n (row direction) pixels in a matrix, where m is an integer greater than or equal to 1 and n is an integer greater than or equal to 1.

Here, the pixel circuit 710C(i,j) is described. The pixel circuit 710C(i,j) includes a pixel circuit 750C(i,j) that includes a display element 750(i,j). For example, the display element 750(i,j) is preferably a liquid crystal element that is driven by alternating current in order to prevent burn-in.

The pixel circuit 710C(i,j) includes subpixel circuits 650CR(i,j), 650CG(i,j), and 650CB(i,j). The subpixel circuits 650CR(i,j), 650CG(i,j), and 650CB(i,j) include display elements 650R(i,j), 650G(i,j), and 650B(i,j), respectively. The subpixel circuits 650CR(i,j), 650CG(i,j), and 650CB(i,j) each have the circuit structure and function described in FIG. 1.

In the subpixel circuit, a light-emitting element is formed by separately coloring organic compound layers including different light-emitting layers depending on colors of light emission. Alternatively, light from a light-emitting layer that emits white light may be transmitted through a color filter to obtain light in a required wavelength range. In the following description, a subpixel circuit including a display element is denoted by 650C(i,j), and the display element included in the subpixel circuit is denoted by 650(i,j) in order to simplify explanation.

Gradation of the display element 750(i,j) included in the pixel circuit 750C(i,j) and gradation of the display element 650(i,j) included in the subpixel circuit 650C(i,j) are controlled by a gradation signal based on voltage or current.

The pixel circuit 750C(i,j) includes the transistor SW1, a capacitor C1, and the display element 750(i,j). The display element 750(i,j) includes a first pixel electrode, an organic compound layer, and a first counter electrode. The first pixel electrode is one of an anode and a cathode, and the first counter electrode is the other of the anode and the cathode.

The gate of the transistor SW1 included in the pixel circuit 750C(i,j) is electrically connected to the scan line G1(j). One of the source and the drain of the transistor SW1 is electrically connected to a signal line S_L(i).

The other of the source and the drain of the transistor SW1 is electrically connected to one electrode of the capacitor C1 and the first pixel electrode. The first pixel electrode is electrically connected to the first counter electrode through the display element 750(i,j).

The reference voltage of the capacitor C1 is applied to the other electrode of the capacitor C1 through a CSCOM terminal. Common voltage is applied to the first counter electrode through a VCOM terminal.

A first gradation signal supplied from the signal line S_L(i) is held in the capacitor C1. Gradation of the display element 750(i,j) is controlled by the first gradation signal held in the capacitor C1. In the following description, the first gradation signal is referred to as first signal voltage because the first gradation signal is supplied as voltage.

The subpixel circuit 650C(i,j) includes the transistor SW2, a transistor SW3, the transistor M, a capacitor C2, and the display element 650(i,j). The display element 650(i,j) includes a second pixel electrode, an organic compound layer, and a second counter electrode. The second pixel electrode is one of an anode and a cathode, and the second counter electrode is the other of the anode and the cathode.

The gate of the transistor SW2 included in the subpixel circuit 650C(i,j) is electrically connected to the scan line G2(j). One of a source and a drain of the transistor SW2 is electrically connected to a signal line S_R(i), a signal line S_G(i), and a signal line S_B(i) of the subpixel circuits. In the following description, each of these signal lines is denoted by S(i) in order to simplify explanation.

Drive current of the transistor M is controlled by a second gradation signal supplied from the signal line S(i). Gradation is controlled by drive current flowing to the display element 650(i,j). In the following description, the second gradation signal is referred to as second signal voltage because the second gradation signal is supplied as voltage.

FIG. 7 is a block diagram illustrating the structure of the display device 700. The display device 700 includes gate drivers 210 and 210A, a selection signal output circuit 170, and the display portion 220. The gate driver 210 includes a shift register circuit 211 and selection circuits 180. The gate driver 210A includes a shift register circuit 212. The selection circuit 180 includes a determination circuit 181 and a determination circuit 182.

The display portion 220 includes pixel circuits 710C(1,1) to 710C(m,n). The pixel circuit 710C(i,j) includes the pixel circuit 750C(i,j) and the subpixel circuits 650CR(i,j), 650CG(i,j), and 650CB(i,j). The pixel circuit 710C(i,j) further includes the scan lines G1(1) to G1(n), the scan lines G2(1) to G2(n), scan lines G3(1) to G3(n), signal lines S_R(1) to S_R(m), signal lines S_G(1) to S_G(m), signal lines S_B(1) to S_B(m), and signal lines S_L(1) to S_L(m).

Figure 8A:
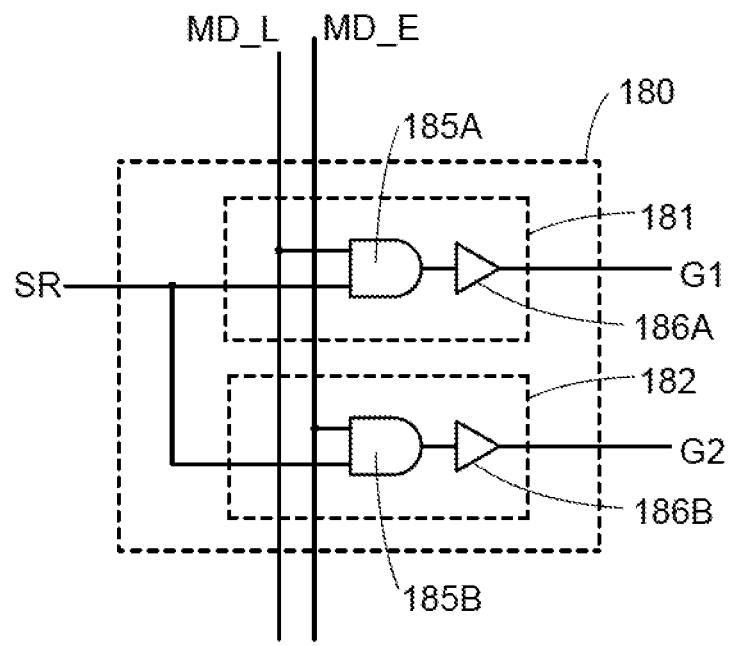
FIG. 8A is a block diagram of a selection circuit and FIG. 8B is a timing chart of FIG. 8A.

FIG. 8A illustrates the structure of the selection circuit 180. The selection circuit 180 includes the determination circuit 181 and the determination circuit 182. The determination circuit 181 includes a logic circuit 185A that determines an input signal condition and a buffer circuit 186A. The determination circuit 182 includes a logic circuit 185B that determines an input signal condition and a buffer circuit 186B.

An output signal SR for selecting the selection circuit 180 is input to one input terminal of the logic circuit 185A and one input terminal of the logic circuit 185B. A selection signal MD_L from the selection signal output circuit 170 is input to the other input terminal of the logic circuit 185A. A selection signal MD_E from the selection signal output circuit 170 is input to the other input terminal of the logic circuit 185B.

Figure 8B:
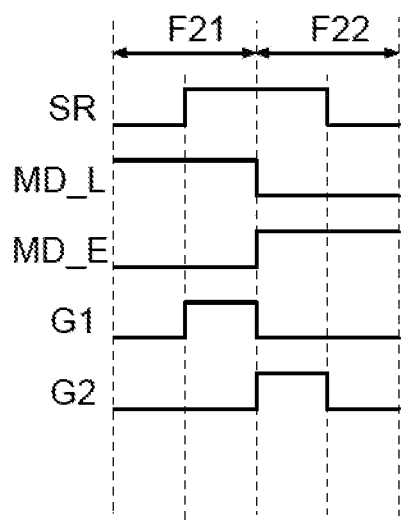

A timing chart F21 in FIG. 8B shows operation of the determination circuit 181 included in the selection circuit 180. When the output signal SR and the selection signal MD_L are High, a High signal is output to the scan line G1. In the other input conditions, a Low signal is output to the scan line G1.

A timing chart F22 in FIG. 8B shows operation of the determination circuit 182 included in the selection circuit 180. When the output signal SR and the selection signal MD_E are High, a High signal is output to the scan line G2. In the other input conditions, a Low signal is output to the scan line G2.

When the output from the buffer circuit 186A is High, a signal having higher voltage than the first signal voltage is output to the scan line G1. When the output from the buffer circuit 186A is Low, a signal having lower voltage than the first signal voltage is output to the scan line G1.

The output from the buffer circuit 186B conforms to the output conditions of G2(j) in FIG. 7 and G1(j) in FIG. 2. In addition, the scan line G3(j) in FIG. 7 conforms to the output condition of G2(j) in FIG. 2. Thus, when the output from the buffer circuit 186B is High, a signal having higher voltage than the second signal voltage that is applied to the gate of the transistor M by capacitive coupling through the capacitor C2 is output to the scan line G2. When the output from the buffer circuit 186B is Low, a signal having lower voltage than the second signal voltage is output to the scan line G2.

It is preferable that the highest voltage of the first signal voltage be higher than the highest voltage of the second signal voltage and that the lowest voltage of the first signal voltage be lower than the lowest voltage of the second signal voltage.

The voltage of the first gradation signal of the display element 750(i,j) is different from the voltage of the second gradation signal of the display element 650; thus, different voltages or the same voltage may be output to the scan line G1 and the scan line G2. When the output from a scan line G3 is Low as shown in FIG. 2, voltage lower than Low of the scan line G2 is output.

Note that when an operation condition in FIG. 8B is satisfied, one embodiment of the present invention is not limited to the circuit structure of the selection circuit 180 in FIG. 8A.

Figure 9A:
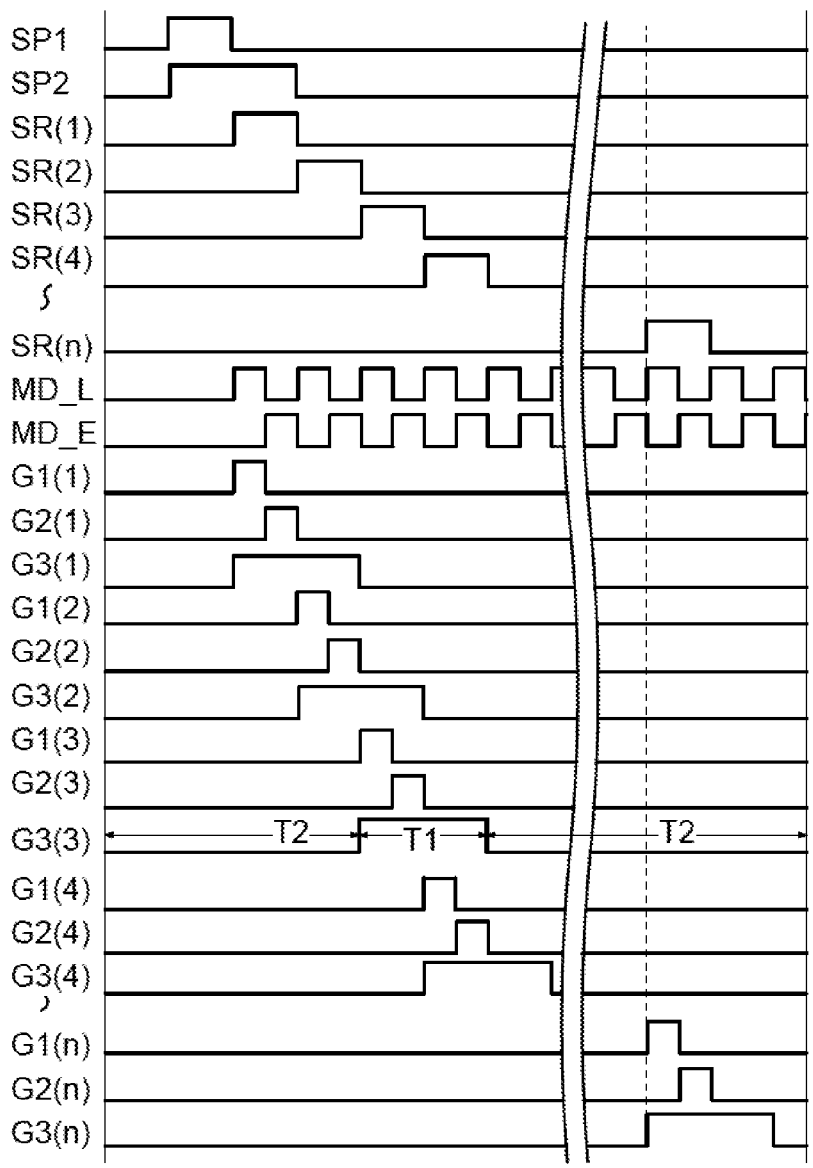
FIG. 9A is a timing chart of FIG. 7

FIG. 9A is a timing chart showing operation of the display device 700 in FIG. 7. The gate driver 210 in FIG. 7 sequentially outputs the output signals SR(1) to SR(n) from the shift register circuit 211. The gate driver 210A sequentially outputs output signals G(1) to G(n) from the shift register circuit 212.

A scan signal output to the scan line G1(j) is generated using the output signal SR(j) from the shift register circuit 211 and the selection signal MD_L from the selection signal output circuit 170 by the determination circuit 181.

A scan signal output to the scan line G2(j) is generated using the output signal SR(j) from the shift register circuit 211 and the selection signal MD_E from the selection signal output circuit 170 by the determination circuit 182.

An operation example of the gate driver 210 in a period when the output signal SR(1) is High is described with reference to a timing chart in FIG. 9A.

While the selection signal MD_L is High in the period when the output signal SR(1) is High, the scan signal of the scan line G1(1) is High, so that the first signal voltage can be written to pixel circuits 750C(i,1) through the signal lines S_L(1) to S_L(m) electrically connected to the pixel circuits 750C(i,1).

While the selection signal MD_E is High in the period when the output signal SR(1) is High, the scan signal of the scan line G2(1) is High, so that the second signal voltage can be written to subpixel circuits 650C(i,1) through the signal lines S(1) to S(m) electrically connected to the subpixel circuits 650C(i,1).

Figure 9B:
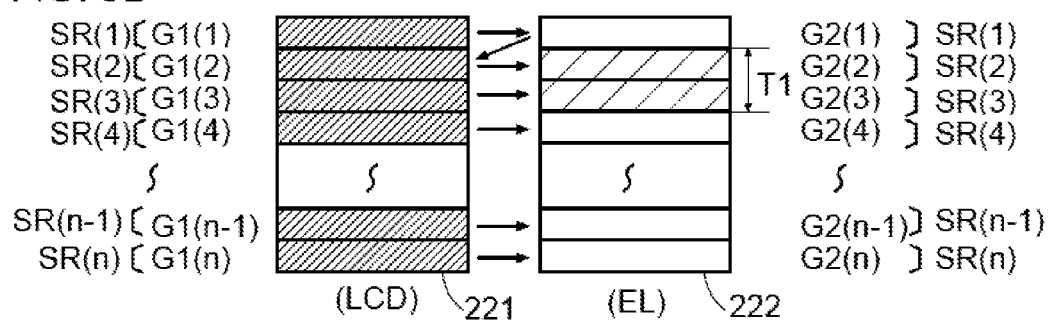
FIG. 9B illustrates operation.

FIG. 9B schematically shows the drive state of the display portion 220. A display region obtained by the pixel circuit 750C(i,j) is referred to as a liquid crystal display region 221, and a display region obtained by the subpixel circuit 650C(i,j) is referred to as a light-emitting display region 222.

Display is updated in the liquid crystal display region 221 frame by frame, whereas an image in the light-emitting display region 222 including subpixels can be controlled by the scan line G3. For example, in the timing chart shown in FIG. 9A, a period when the start pulse SP2 is High is denoted by T1. Thus, as shown in FIG. 9B, light can be emitted only in a period when the scan lines G3(3) and G3(2) are High. The light emission period T1 can be freely controlled by the start pulse SP2.

A scan signal is output to the scan line G1(j) by the output signals SR(1) to SR(n), the selection signal MD_L, the selection signal MD_E, and the selection circuit 180, so that an image to be displayed is updated in the liquid crystal display region 221. In addition, a scan signal is output to the scan line G2(j), so that an image to be displayed is updated in the light-emitting display region 222. Furthermore, the light emission period T1 is controlled by output of a scan signal to the scan line G3(j).

In the circuit illustrated in FIG. 7, the scan signal for the scan line G1 and the scan signal for the scan line G2 become High at different timings. Thus, the first gradation signal and the second gradation signal supplied to the signal line do not influence each other.

Selection of the scan line G1(1) that is electrically connected to the gate of the transistor SW1 included in the pixel circuit 750C(i,1) or the scan line G2(1) that is electrically connected to the gate of the transistor SW2 included in the subpixel circuit 650C(i,1) can be controlled by the gate driver 210 including the shift register circuit 211, the selection signal MD_L, the selection signal MD_E, and the selection circuits 180.

While the scan line G2(1) is High, the scan line G3(1) maintains the High state, so that the second signal voltage is written to the subpixel circuit 650C(i,1) and light is emitted. When the scan line G3(1) becomes Low, the second signal voltage written to the subpixel circuit 650C(i,1) is canceled and light emission is terminated.

In the example illustrated in FIG. 7, n-channel transistors are included in the determination circuits 181 and 182 because the selection signal MD_L and the selection signal MD_E are used. The determination circuits 181 and 182 can each be formed using a complementary MOS switch (a CMOS switch or an analog switch). By using a complementary MOS switch, selection conditions can be determined by a positive logic or a negative logic; accordingly, the number of selection signals can be reduced.

In the pixel circuit 710C(i,j) in FIG. 6, variations in electrical characteristics of the transistor M included in the subpixel circuit 650CR(i,j) cause variations in drive current supplied to the display element 650R(i,j). Accordingly, the gradation is not controlled precisely.

In order to precisely control the gradation of the display element 650R(i,j), voltage generated by the second gradation signal needs to be applied to the gate of the transistor M, using the source voltage of the transistor M as a reference. Thus, the transistors SW1 and SW3 preferably have low leakage in their off states.

In the example of the pixel circuit 710C(i,j) in FIG. 6, transistors with the same conductivity type are included.

Here, the transistor SW1, the transistor SW2, the transistor SW3, and the transistor M are n-channel transistors and an oxide semiconductor is used for each semiconductor layer. The transistor SW1, the transistor SW2, the transistor SW3, and the transistor M are bottom-gate transistors. Each of the transistor SW1, the transistor SW2, the transistor SW3, and the transistor M may be a dual-gate transistor that includes a back gate.

Note that one embodiment of the present invention is not limited to the circuit structure of the pixel circuit 710C(i,j) in FIG. 6. Examples of the circuit structure of the pixel circuit 710C(i,j) which are different from that in FIG. 6 are illustrated in FIGS. 10A to 10D. Combinations of the pixel circuit 750C(i,j) and the subpixel circuit 650CR(i,j) in the pixel circuit 710C(i,j) are illustrated.

FIGS. 10A to 10D each illustrate a pixel in which transistors have back gates. Except for the transistor structure, the circuits in FIGS. 10A to 10D are similar to that illustrated in FIG. 6. The gate and the back gate of the transistor preferably have an overlap region with a channel formation region positioned therebetween.

Figure 10A:
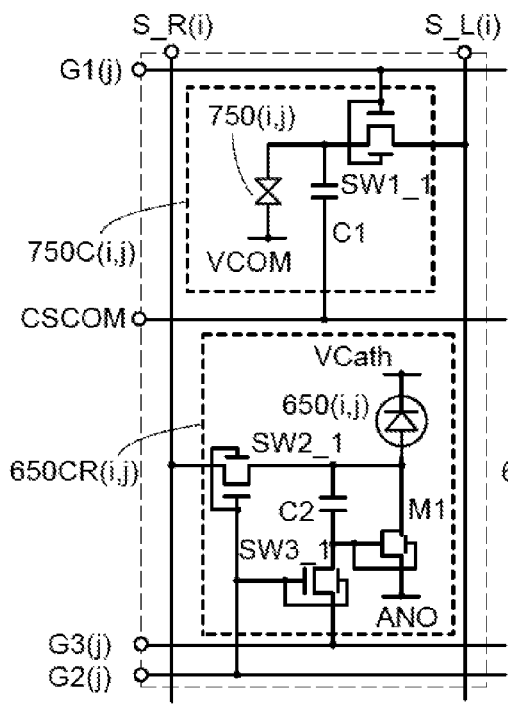
FIGS. 10A to 10D each illustrate the structure of a pixel.

FIG. 10A is different from FIG. 6 in the following points. In FIG. 10A, transistors included in the pixel circuit 710C(i,j) have back gates. Gates of a transistor SW1_1, a transistor SW2_1, and a transistor SW3_1 are electrically connected to back gates of the transistor SW1_1, the transistor SW2_1, and the transistor SW3_1, respectively. Similarly, a gate of a transistor M1 is electrically connected to a back gate of the transistor M1.

The same voltage as the gate voltage of the transistor SW1_1 is applied to the back gate of the transistor SW1_1. The same voltages as the gate voltages of the transistor SW2_1, the transistor SW3_1, and the transistor M1 are applied to the back gates of the transistor SW2_1, the transistor SW3_1, and the transistor M1, respectively.

Figure 10B:
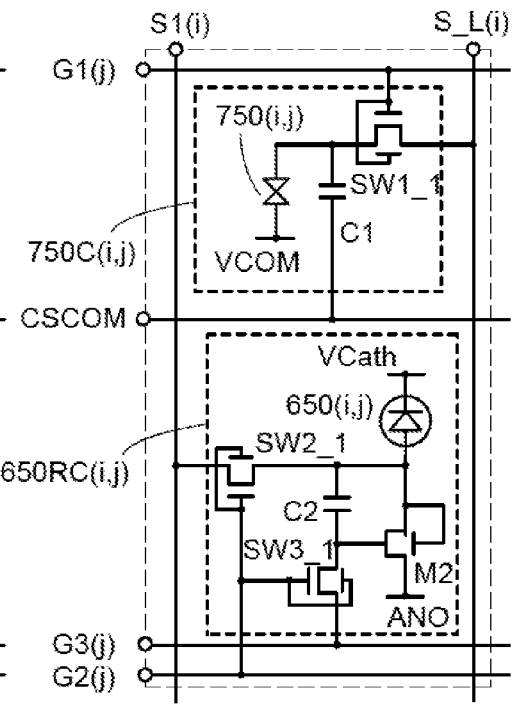

FIG. 10B is different from FIG. 10A in the following points. In FIG. 10B, a back gate of a transistor M2 is connected to a source of the transistor M2. The same voltage as the source voltage of the transistor M2 is applied to the back gate of the transistor M2.

Figure 10C:
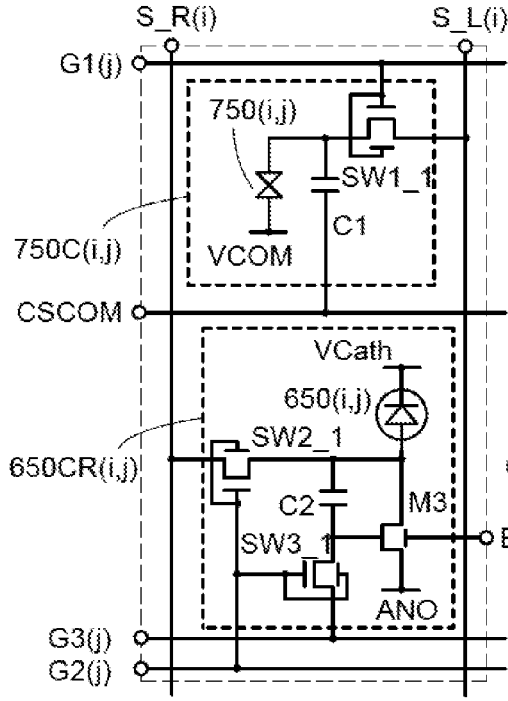

FIG. 10C is different from FIG. 10A in the following points. In FIG. 10C, a back gate of a transistor M3 is connected to a BGL terminal. Back gate voltage can be applied from the BGL terminal.

Figure 10D:
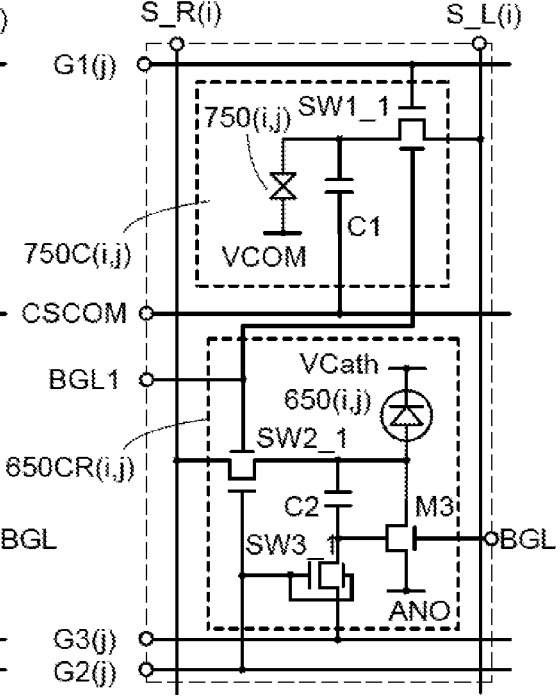

FIG. 10D is different from FIG. 10C in the following points. In FIG. 10D, a back gate of a transistor SW1_2 and a back gate of a transistor SW2_2 are connected to a BGL1 terminal. Back gate voltage can be applied from the BGL1 terminal. Voltage applied to the BGL1 terminal may be the same as or different from that applied to the BGL terminal.

Note that the circuit structure of the pixel circuit 710C(i,j) in one embodiment of the present invention is not limited to those in FIGS. 10A to 10D. Other signal lines can be electrically connected to the back gates, or other combinations of connection can be employed.

Note that one embodiment of the present invention can be combined with a back gate of a transistor used in the gate driver 210.

The structures, methods, driving timing described in this embodiment can be combined with any of those described in the other embodiments as appropriate.

Embodiment 3

In this embodiment, the structures of the display device 700 in one embodiment of the present invention are described with reference to FIG. 11, FIGS. 12A and 12B, FIG. 13, FIGS. 14A to 14C, and FIGS. 15A to 15C.

Figure 11:
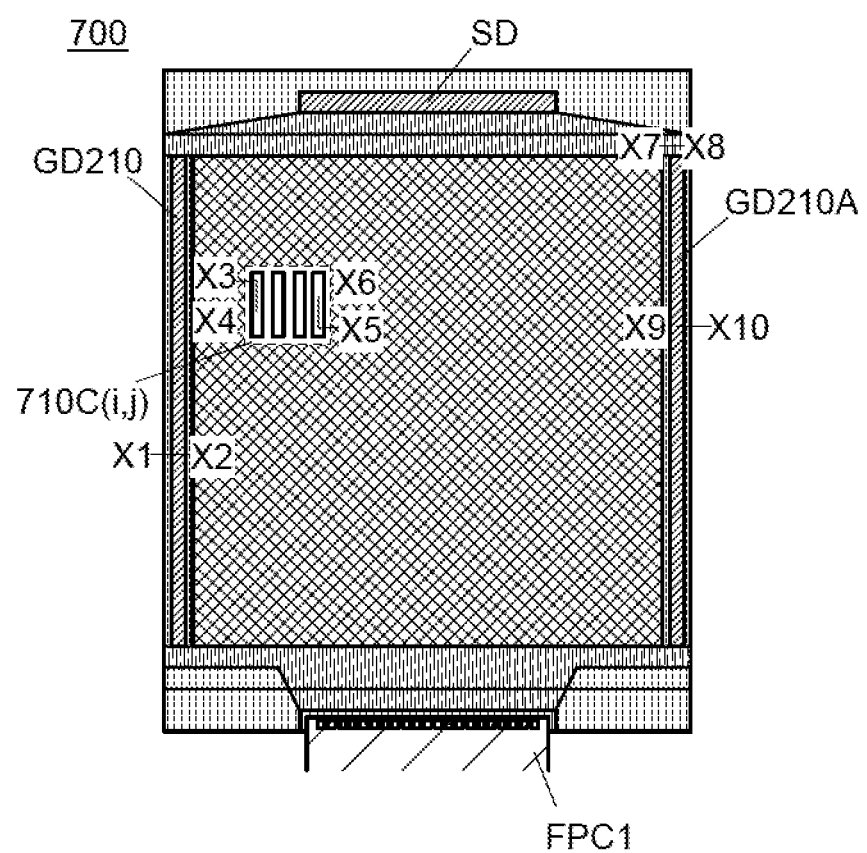
FIG. 11 illustrates the structure of a display panel.
Figure 12:
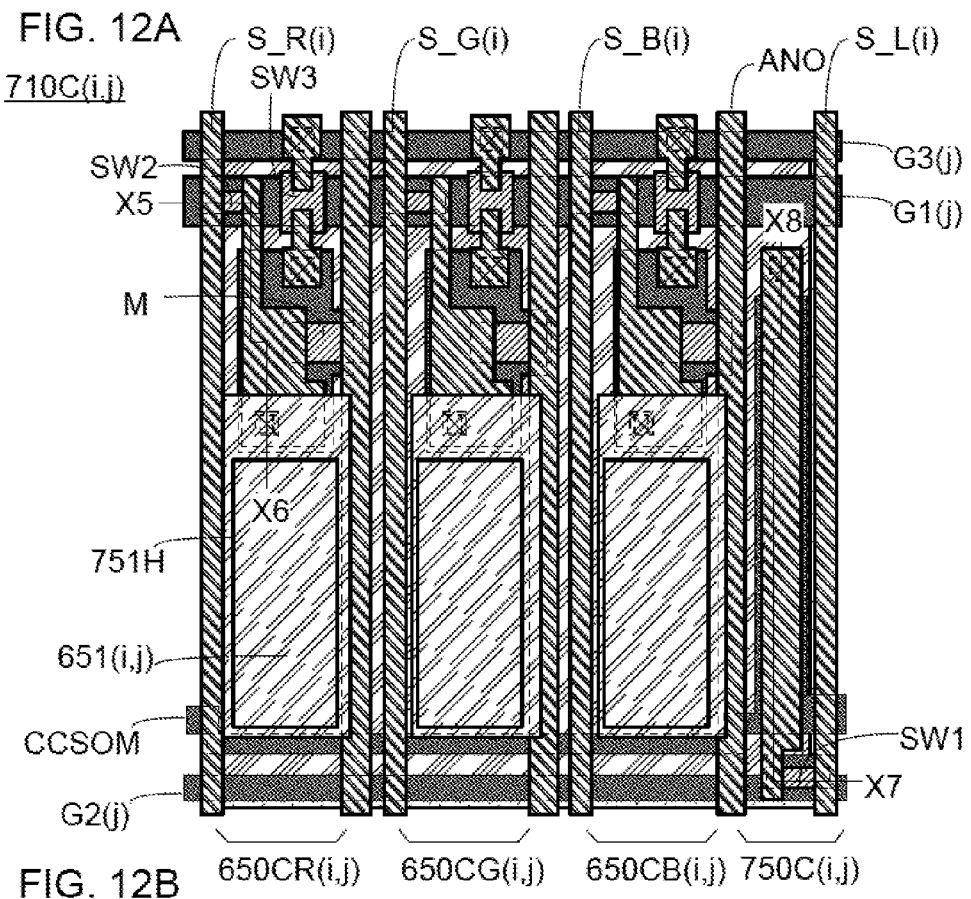
FIGS. 12A and 12B each illustrate the structure of a pixel.

FIG. 11 illustrates the structure of the display device 700 in one embodiment of the present invention. FIG. 11 is a top view of the display device 700 in one embodiment of the present invention. FIG. 12A is a bottom view illustrating part of the display device 700 in FIG. 11. FIG. 12B is a bottom view in which some components illustrated in FIG. 12A are omitted.

Figure 13:
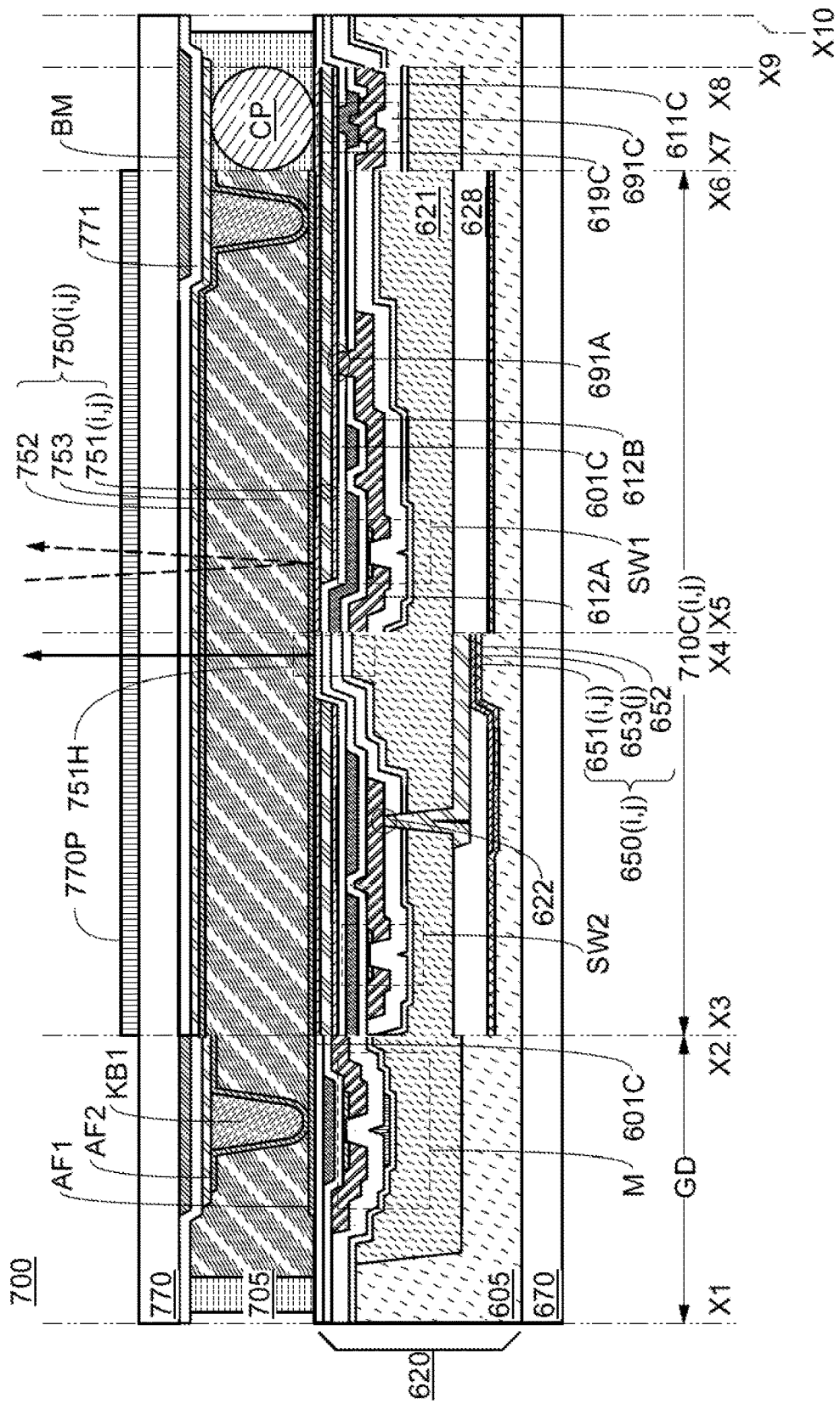
FIG. 13 illustrates the structure of a display device.

FIG. 13 illustrates the structure of the display device 700 in one embodiment of the present invention. FIG. 13 is a cross-sectional view taken along cutting plane lines X1-X2, X3-X4, X5-X6, X7-X8, and X9-X10 in FIG. 11.

Figure 14A:
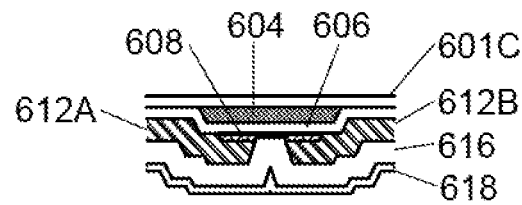
FIGS. 14A to 14C each illustrate the structure of a transistor.
Figure 14B:
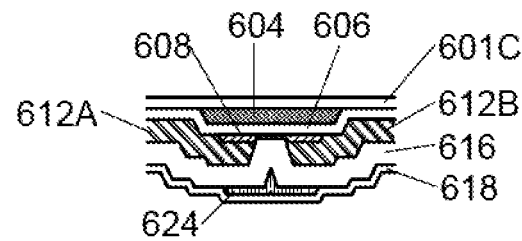
Figure 14C:
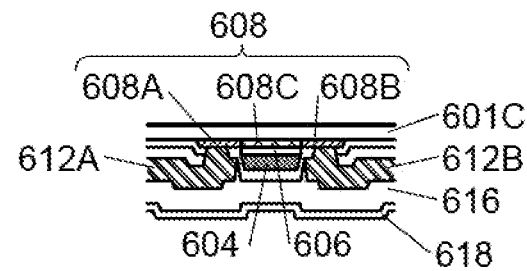
Figure 15A:
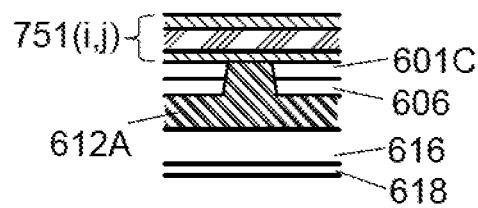
FIGS. 15A to 15C each illustrate the structure of a display device.
Figure 15B:
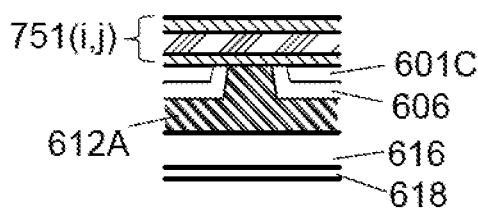
Figure 15C:
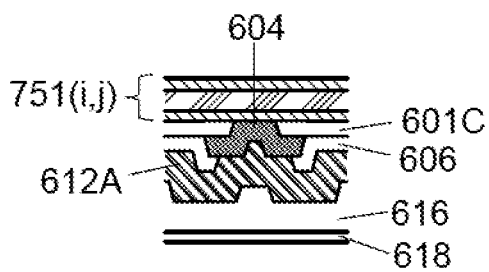

FIGS. 14A to 14C are cross-sectional views each illustrating the structure of part of the display device 700, and FIGS. 15A to 15C are cross-sectional views each illustrating the structure of another part of the display device 700.

<Structure Example 1 of Display Device>

The display device 700 described in this embodiment includes the signal line S_R(i), the signal line S_G(i), the signal line S_B(i), the signal line S_L(i), the scan line G1($j$), the scan line G2($j$), the scan line G3($j$), and the pixel circuit 710C(i,j).

The pixel circuit 710C(i,j) is electrically connected to the signal line S_R(i), the signal line S_G(i), the signal line S_B(i), the signal line S_L(i), the scan line G1($j$), the scan line G2($j$), and the scan line G3($j$).

The pixel circuit 710C(i,j) includes the pixel circuit 750C(i,j) and the subpixel circuit 650C(i,j). The pixel circuit 710C(i,j) further includes the display element 750($i,j$) included in the pixel circuit 750C(i,j), a first conductive film, a second conductive film, a second insulating film 601C, and the display element 650($i,j$) included in the subpixel circuit 650C(i,j) (FIG. 13).

The first conductive film is electrically connected to the display element 750($i,j$) (see FIG. 13). For example, the first conductive film can be used for a first electrode 751($i,j$) of the display element 750($i,j$).

The second conductive film has a region overlapping with the first conductive film. For example, the second conductive film can be used as a conductive film 612A or 612B functioning as a source or a drain of a transistor that can be used as the transistor SW1.

The second insulating film 601C has a region positioned between the second conductive film and the first conductive film.

The pixel circuit 710C(i,j) is electrically connected to the second conductive film. For example, a transistor in which the second conductive film is used as the conductive film 612B functioning as a source or a drain can be used as the transistor SW1 of the pixel circuit 710C(i,j) (see FIG. 13).

The insulating film 601C has an opening 691A (see FIG. 13 and FIG. 15A).

The second conductive film is electrically connected to the first conductive film in the opening 691A. For example, the conductive film 612B is electrically connected to the first electrode 751($i,j$).

The pixel circuit 710C(i,j) is electrically connected to the signal line S(i) (see FIG. 6). Note that the conductive film 612A is electrically connected to the signal line S_L(i) (see FIG. 13).

The first electrode 751($i,j$) has an edge portion embedded in the second insulating film 601C.

Furthermore, the pixel circuit 710C(i,j) of the display device 700 described in this embodiment includes the transistor SW1, the transistor SW2, the transistor SW3, and the transistor M. Each of the transistors includes an oxide semiconductor.

Furthermore, the display element 650($i,j$) of the display device 700 described in this embodiment has a function of displaying an image in the same direction as the display direction of the display element 750($i,j$). For example, a dashed arrow in the drawing denotes the direction in which the display element 750($i,j$) displays an image by adjusting the intensity of external light reflection. In addition, a solid arrow in the drawing denotes the direction in which the display element 650($i,j$) displays an image (see FIG. 13).

In addition, the display element 650($i,j$) has an opening 751H in a region where the display element 750($i,j$) described in this embodiment displays an image so that the display element 650($i,j$) displays an image (see FIG. 12B). Note that the display element 750($i,j$) displays an image in a region overlapping with the first electrode 751($i,j$), and the display element 650($i,j$) displays an image in a region overlapping with the opening 751H.

Furthermore, the display element 750($i,j$) described in this embodiment includes a reflective film that reflects incident light and has a function of adjusting the intensity of reflected light. The reflective film has the opening 751H. Note that for example, the first conductive film, the first electrode 751($i,j$), or the like can be used as the reflective film of the display element 750($i,j$).

Furthermore, the display element 650($i,j$) has a function of emitting light toward the opening 751H.

The display device 700 in the one embodiment of the present invention includes a first conductive film electrically connected to the display element 750($i,j$), a second conductive film having a region overlapping with the first conductive film, an insulating film having a region positioned between the second conductive film and the first conductive film, a pixel circuit electrically connected to the second conductive film, and the display element 650($i,j$) electrically connected to the pixel circuit. The second insulating film has an opening. The second conductive film is electrically connected to the first conductive film in the opening.

Accordingly, the display element 750($i,j$) and the display element 650($i,j$) that displays an image using a method different from that of the display element 750($i,j$) can be driven, for example, with pixel circuits that can be formed in the same process. As a result, a novel display device that is highly convenient or reliable can be provided.

In addition, the display element 750($i,j$) described in this embodiment includes a layer 753 containing a liquid crystal material, the first electrode 751($i,j$), and a second electrode 752. Note that the second electrode 752 is provided so that an electric field for controlling alignment of the liquid crystal material is generated between the second electrode 752 and the first electrode 751($i,j$).

Furthermore, the display device 700 described in this embodiment includes an alignment film AF1 and an alignment film AF2. The alignment film AF2 is provided so that the layer 753 containing a liquid crystal material is positioned between the alignment films AF1 and AF2.

In addition, the display element 650($i,j$) described in this embodiment includes a third electrode 651($i,j$), a fourth electrode 652, and a layer 653($j$) containing a light-emitting organic compound.

The fourth electrode 652 has a region overlapping with the third electrode 651($i,j$). The layer 653($j$) containing a light-emitting organic compound is positioned between the third electrode 651($i,j$) and the fourth electrode 652. The third electrode 651(i,j) is electrically connected to the pixel circuit 710C(i,j) in a contact portion 622.

Moreover, the pixel circuit 710C(i,j) described in this embodiment includes a light-blocking film BM, an insulating film 771, and a functional film 770P.

The insulating film 771 is positioned between the light-blocking film BM and the layer 753 containing a liquid crystal material. Impurity diffusion from the light-blocking film BM to the layer 753 containing a liquid crystal material can be suppressed.

The functional film 770P has a region overlapping with the display element 750(i,j). The functional film 770P is provided so that a substrate 770 is positioned between the functional film 770P and the display element 750(i,j).

In addition, the display device 700 described in this embodiment includes a substrate 670, the substrate 770, and a functional layer 620.

The substrate 770 has a region overlapping with the substrate 670. The functional layer 620 is positioned between the substrates 670 and 770.

The functional layer 620 includes the pixel circuit 710C(i,j), the display element 650(i,j), an insulating film 621, and an insulating film 628. Furthermore, the functional layer 620 includes an insulating film 616 and an insulating film 618.

The insulating film 621 is positioned between the display element 750(i,j) and the display element 650(i,j).

The insulating film 628 is positioned between the insulating film 621 and the substrate 670 and has an opening in a region overlapping with the display element 650(i,j). The insulating film 628 formed along the edge of the third electrode 651(i,j) can prevent short circuit between the third electrode 651(i,j) and the fourth electrode.

The insulating film 618 has a region positioned between the insulating film 621 and the display element 750(i,j). The insulating film 616 has a region positioned between the insulating film 618 and the display element 750(i,j).

Moreover, the display device 700 described in this embodiment includes a bonding layer 605, a sealant 705, and a structure body KB1.

The bonding layer 605 is positioned between the functional layer 620 and the substrate 670 and has a function of bonding the functional layer 620 and the substrate 670.

The sealant 705 is positioned between the functional layer 620 and the substrate 770 and has a function of bonding the functional layer 620 and the substrate 770.

The structure body KB1 has a function of making a predetermined gap between the functional layer 620 and the substrate 770.

In addition, the display device 700 described in this embodiment includes a terminal 619C, a conductive film 611C, and a conductor CP.

The second insulating film 601C has a region positioned between the terminal 619C and the conductive film 611C. In addition, the second insulating film 601C has an opening 691C.

The terminal 619C is electrically connected to the conductive film 611C in the opening 691C. In addition, the conductive film 611C is electrically connected to the pixel circuit 710C(i,j).

The conductor CP is positioned between the terminal 619C and the second electrode 752 for electrically connecting the terminal 619C and the second electrode 752. For example, a conductive particle can be used as the conductor CP.

Although FIG. 13 illustrates the case where the opening 691A and the opening 691C included in the display device 700 have different structures, the opening 691A and the opening 691C included in the display device 700 may have the same structure. In FIG. 15A, the first electrode 751(i,j) is electrically connected to the second conductive film 612A, 612B, or 611C in the opening 691A. The second insulating film 601C and an insulating film 606 are in contact with the second conductive film 612A, 612B, or 611C. In FIG. 15C, the first conductive film is electrically connected to the second conductive film through a conductive film 604 in the opening 691C. FIG. 15B differs from FIG. 15A in that the insulating film 606 is embedded in the second insulating film 601C and the second conductive film 612A is in contact with the insulating film 606 in the opening 691B.

Moreover, the display device 700 described in this embodiment includes a gate driver 201, a gate driver 201A, and a source driver SD (see FIG. 11).

The gate driver 210 and the gate driver 201A are electrically connected to the scan line G1(j), the scan line G2(j), and the scan line G3(j). The gate driver 210 and the gate driver 201A each include, for example, a transistor MD. Specifically, a transistor that includes a semiconductor film and can be formed in the same step as the transistor included in the pixel circuit 710C(i,j) can be used as the transistor MD (see FIG. 13).

The source driver SD is electrically connected to the signal line S_R(i), the signal line S_G(i), the signal line S_B(i), and the signal line S_L(i). The source driver SD is electrically connected to a terminal using a conductive material, for example. The terminal can be formed in the same step as the terminal 619C.

Individual components of the display device are described below. Note that these components cannot be clearly distinguished and one component serves as another component or includes part of another component in some cases.

For example, the first conductive film can be used as the first electrode 751(i,j). The first conductive film can be used as a reflective film.

In addition, the second conductive film can be used as the conductive film 612B functioning as a source or a drain of a transistor.

Structure Example 1

The display device 700 in one embodiment of the present invention includes the substrate 670, the substrate 770, the structure body KB1, the sealant 705, or the bonding layer 605.

The display device 700 in one embodiment of the present invention includes the functional layer 620, the insulating film 621, and the insulating film 628.

The display device 700 in one embodiment of the present invention includes the signal line S_R(i), the signal line S_G(i), the signal line S_B(i), the signal line S_L(i), the scan line G1(j), the scan line G2(j), the scan line G3(j), a wiring CSCOM, and a wiring ANO.

The display device 700 in one embodiment of the present invention includes the first conductive film or the second conductive film.

The display device 700 in one embodiment of the present invention includes the terminal 619C and the second conductive film 611C.

The display device 700 in one embodiment of the present invention includes the pixel circuit 710C(i,j), the transistor SW1, the transistor SW2, the transistor SW3, and the transistor M.

The display device 700 in one embodiment of the present invention includes the display element 750(i,j), the first electrode 751(i,j), the reflective film, the opening 751H, the layer 753 containing a liquid crystal material, and the second electrode 752.

The display device 700 in one embodiment of the present invention includes the alignment film AF1, the alignment film AF2, the light-blocking film BM, the insulating film 771, and the functional film 770P.

In the display device 700, the coloring film CF1 may be provided between the insulating film 621 and the display element 750(i,j) in a position overlapping with the opening 751H through which light from the display element 650(i,j) passes.

The display device 700 in one embodiment of the present invention includes the display element 650(i,j), the electrode 651(i,j), the electrode 652, or the layer 653(j) containing a light-emitting organic compound.

The display device 700 in one embodiment of the present invention includes the second insulating film 601C.

The display device 700 in one embodiment of the present invention includes the gate driver 210, the gate driver 210A, or the source driver SD.

<Substrate 670>

The substrate 670 or the like can be formed using a material having heat resistance high enough to withstand heat treatment in a manufacturing process. Specifically, non-alkali glass with a thickness of 0.7 mm can be used.

For example, a large-area glass substrate having any of the following sizes can be used as the substrate 670 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

An organic material, an inorganic material, a composite material of an organic material and an inorganic material, or the like can be used for the substrate 670 or the like. For example, an inorganic material such as glass, ceramics, or metal can be used for the substrate 670 or the like.

Specifically, non-alkali glass, soda-lime glass, potash glass, crystal glass, quartz, sapphire, or the like can be used for the substrate 670 or the like. Specifically, an inorganic oxide film, an inorganic nitride film, an inorganic oxynitride film, or the like can be used for the substrate 670 or the like. For example, a film of silicon oxide, silicon nitride, silicon oxynitride, alumina, or the like can be used for the substrate 670 or the like. SUS, aluminum, or the like can be used for the substrate 670 or the like.

For example, a single crystal semiconductor substrate or a polycrystalline semiconductor substrate of silicon or silicon carbide, a compound semiconductor substrate of silicon germanium, or an SOI substrate can be used as the substrate 670 or the like. Thus, a semiconductor element can be formed over the substrate 670 or the like.

For example, an organic material such as a resin, a resin film, or plastic can be used for the substrate 670 or the like. Specifically, a resin film or resin plate of polyester, polyolefin, polyamide, polyimide, polycarbonate, an acrylic resin, or the like can be used for the substrate 670 or the like.

For example, a composite material, such as a resin film to which a metal plate, a thin glass plate, or an inorganic film is bonded can be used for the substrate 670 or the like. For example, a composite material formed by dispersing a fibrous or particulate metal, glass, inorganic material, or the like into a resin film can be used for the substrate 670 or the like. For example, a composite material formed by dispersing a fibrous or particulate resin, organic material, or the like into an inorganic material can be used for the substrate 670 or the like.

A single-layer material or a material in which a plurality of layers are stacked can be used for the substrate 670 or the like. For example, a material in which a base, an insulating film that prevents diffusion of impurities contained in the base, and the like are stacked can be used for the substrate 670 or the like. Specifically, a material in which glass and one or more films that prevent diffusion of impurities contained in the glass and that are selected from a silicon oxide layer, a silicon nitride layer, a silicon oxynitride layer, or the like are stacked can be used for the substrate 670 or the like. Alternatively, a material in which a resin and a film for preventing diffusion of impurities that penetrate the resin, such as a silicon oxide film, a silicon nitride film, or a silicon oxynitride film are stacked can be used for the substrate 670 or the like.

Specifically, a resin film, a resin plate, a stack, or the like of polyester, polyolefin, polyamide, polyimide, polycarbonate, an acrylic resin, or the like can be used for the substrate 670 or the like.

Specifically, a material including polyester, polyolefin, polyamide (e.g., nylon or aramid), polyimide, polycarbonate, polyurethane, an acrylic resin, an epoxy resin, or a resin having a siloxane bond can be used for the substrate 670 or the like.

Specifically, polyethylene terephthalate (PET), polyethylene naphthalate (PEN), polyethersulfone (PES), acrylic, or the like can be used for the substrate 670 or the like.

Alternatively, paper, wood, or the like can be used for the substrate 670 or the like.

For example, a flexible substrate can be used as the substrate 670 or the like.

Note that a transistor, a capacitor, or the like can be directly formed on the substrate. Alternatively, a transistor, a capacitor, or the like can be formed over a substrate that is for use in manufacturing processes and withstands heat applied in the processes, and then can be transferred to the substrate 670 or the like. Accordingly, a transistor, a capacitor, or the like can be formed over a flexible substrate.

<Substrate 770>

For example, a light-transmitting material can be used for the substrate 770. Specifically, a material selected from the materials that can be used for the substrate 670 can be used for the substrate 770. Specifically, a non-alkali glass that is polished to a thickness of approximately 0.7 mm or 0.1 mm can be used.

<Structure Body KB1>

For example, an organic material, an inorganic material, or a composite material of an organic material and an inorganic material can be used for the structure body KB1 or the like. Thus, components between which the structure body KB1 or the like is positioned can have a predetermined gap.

Specifically, one of polyester, polyolefin, polyamide, polyimide, polycarbonate, polysiloxane, an acrylic resin, and the like; a composite material of a plurality of kinds of resins selected from these; or the like can be used for the structure body KB1 or the like. Alternatively, a photosensitive material may be used.

<Sealant 705>

An inorganic material, an organic material, a composite material of an inorganic material and an organic material, or the like can be used for the sealant 705 or the like.

For example, an organic material such as a thermally fusible resin or a curable resin can be used for the sealant 705 or the like.

For example, an organic material such as a reactive curable adhesive, a photo-curable adhesive, a thermosetting adhesive, and/or an anaerobic adhesive can be used for the sealant 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealant 705 or the like.

<Bonding Layer 605>

For example, a material that can be used for the sealant 705 can be used for the bonding layer 605.

<Insulating Film 621>

For example, an insulating inorganic material, an insulating organic material, or an insulating composite material containing an inorganic material and an organic material can be used for the insulating film 621 or the like.

Specifically, an inorganic oxide film, an inorganic nitride film, an inorganic oxynitride film, or a material obtained by stacking any of these films can be used for the insulating film 621 or the like. For example, a film including any of a silicon oxide film, a silicon nitride film, a silicon oxynitride film, and an aluminum oxide film, or a film including a material obtained by stacking any of these films can be used for the insulating film 621 or the like.

Specifically, one of polyester, polyolefin, polyamide, polyimide, polycarbonate, polysiloxane, an acrylic resin, and the like; a stack material or a composite material of a plurality of kinds of resins selected from these; or the like can be used for the insulating film 621 or the like. Alternatively, a photosensitive material may be used.

Thus, for example, steps due to components overlapping with the insulating film 621 can be eliminated.

<Insulating Film 628>

For example, a material that can be used for the insulating film 621 can be used for the insulating film 628 or the like. Specifically, a 1-μm-thick film containing polyimide can be used for the insulating film 628.

<Second Insulating Film 601C>

For example, the material that can be used for the insulating film 621 can be used for the second insulating film 601C. Specifically, a material containing silicon and oxygen can be used for the second insulating film 601C. Thus, impurity diffusion into the pixel circuit, the display element, or the like can be suppressed.

For example, a 200-nm-thick film containing silicon, oxygen, and nitrogen can be used as the second insulating film 601C.

Note that the second insulating film 601C includes the opening 691A or 691C.

<Wiring, Terminal, Conductive Film>

A conductive material can be used for a wiring or the like. Specifically, the conductive material can be used for the signal line S_R(i), the signal line S_G(i), the signal line S_B(i), the signal line S_L(i), the scan line G1(j), the scan line G2(j), the scan line G3(j), the wiring CSCOM, the wiring ANO, the terminal 619C, the second conductive film 611C, or the like.

For example, an inorganic conductive material, an organic conductive material, a metal material, a conductive ceramic material, or the like can be used for the wiring or the like.

Specifically, a metal element selected from aluminum, gold, platinum, silver, copper, chromium, tantalum, titanium, molybdenum, tungsten, nickel, iron, cobalt, palladium, or manganese, or the like can be used for the wiring or the like. Alternatively, an alloy including any of the above metal elements, or the like can be used for the wiring or the like. In particular, an alloy of copper and manganese is suitably used in microfabrication with wet etching.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in that order, or the like can be used for the wiring or the like.

Specifically, conductive oxide such as indium oxide, indium tin oxide, indium zinc oxide, zinc oxide, or zinc oxide to which gallium is added can be used for the wiring or the like.

Specifically, a film containing graphene or graphite can be used for the wiring or the like.

For example, a film including graphene oxide is formed and is reduced, so that a film including graphene can be formed. As a reducing method, a method using heat, a method using a reducing agent, or the like can be employed.

Specifically, a conductive high molecule can be used for the wiring or the like.

<First Conductive Film, Second Conductive Film>

For example, the material that can be used for the wiring or the like can be used for the first conductive film or the second conductive film.

The first electrode 751(i,j), the wiring, or the like can be used for the first conductive film.

The conductive film 612B, the wiring, or the like of the transistor that can be used as the transistor SW1 can be used for the second conductive film.

<Transistor SW1, Transistor SW2, Transistor SW3, Transistor M>

For example, a bottom-gate transistor, a top-gate transistor, or the like can be used as the transistor SW1, the transistor SW2, the transistor SW3, the transistor M, or the like. FIGS. 14A to 14C illustrate examples of bottom-gate transistors and a top-gate transistor. FIG. 14A illustrates a bottom-gate transistor. FIG. 14B illustrates a bottom-gate transistor that includes a back gate. FIG. 14C illustrates a top-gate transistor.

For example, a transistor using a semiconductor containing a Group 14 element for a semiconductor film can be used. Specifically, a semiconductor containing silicon can be used for the semiconductor film. For example, single crystal silicon, polysilicon, microcrystalline silicon, amorphous silicon, or the like can be used for the semiconductor film of the transistor.

For example, a transistor using an oxide semiconductor for a semiconductor film can be used. Specifically, an oxide semiconductor containing indium or an oxide semiconductor containing indium, gallium, and zinc can be used for a semiconductor film. Note that the details of the oxide semiconductor example will be described in Embodiment 4.

For example, a transistor having lower leakage current in an off state than a transistor that uses amorphous silicon for a semiconductor film can be used as the transistor SW1, the transistor SW2, the transistor SW3, the transistor M, or the like. Specifically, a transistor using an oxide semiconductor for a semiconductor film 608 can be used as the transistor SW1, the transistor SW2, the transistor SW3, the transistor M, or the like.

Thus, a pixel circuit can hold an image signal for a longer time than a pixel circuit including a transistor that uses amorphous silicon for a semiconductor film. Specifically, a selection signal can be supplied at a frequency of lower than 30 Hz, preferably lower than 1 Hz, more preferably less than once a minute while flickering is suppressed. Consequently, eyestrain on a user of an information processing device can be reduced, and power consumption for driving can be reduced.

The transistor that can be used as the transistor SW1, the transistor SW2, the transistor SW3, the transistor M, or the like includes the semiconductor film 608 and the conductive film 604 having a region overlapping with the semiconductor film 608 (see FIG. 14A). Furthermore, each of the transistors includes the conductive film 612A and the conductive film 612B.

Note that the conductive film 604 and the insulating film 606 function as a gate and a gate insulating film, respectively. Furthermore, the conductive film 612A functions as one of a source and a drain, and the conductive film 612B functions as the other of the source and the drain.

In addition, a transistor that includes the semiconductor film 608 provided between the conductive film 604 and the conductive film 624 can be used as each of the transistors (see FIG. 14B).

A conductive film in which a 10-nm-thick film containing tantalum and nitrogen and a 300-nm-thick film containing copper are stacked in that order can be used as the conductive film 604.

A material in which a 400-nm-thick film containing silicon and nitrogen and a 200-nm-thick film containing silicon, oxygen, and nitrogen are stacked can be used for the insulating film 606.

A 25-nm-thick film containing indium, gallium, and zinc can be used as the semiconductor film 608.

A conductive film in which a 50-nm-thick film containing tungsten, a 400-nm-thick film containing aluminum, and a 100-nm-thick film containing titanium are stacked in that order can be used as the conductive film 612A or 612B. Alternatively, a conductive film in which a 50-nm-thick film containing titanium, a 400-nm-thick film containing aluminum, and a 100-nm-thick film containing titanium are stacked in that order may be used.

FIG. 14C illustrates a transistor structure different from the transistor structures in FIGS. 14A and 14B. A transistor TRT in FIG. 14C includes the conductive film 604 having a region overlapping with the second insulating film 601C and the semiconductor film 608 having a region positioned between the second insulating film 601C and the conductive film 604. Note that the conductive film 604 functions as a gate electrode.

The semiconductor film 608 includes a first region 608A, a second region 608B, and a third region 608C. The first region 608A and the second region 608B do not overlap with the conductive film 604. The third region 608C lies between the first region 608A and the second region 608B and overlaps with the conductive film 604.

The transistor TRT includes the insulating film 606 between the third region 608C and the conductive film 604. Note that the insulating film 606 functions as a gate insulating film.

The first region 608A and the second region 608B have lower resistivity than the third region 608C and function as a source region or a drain region.

A capacitance component included in a transistor can be reduced in the top-gate transistor in FIG. 14C. Thus, parasitic capacitance of the scan line or the signal line is reduced, so that load of the gate driver or the source driver can be reduced. Consequently, the circuit size of the driver can be reduced. In addition, power consumption can be reduced because drive load can be reduced.

<Display Element 750(i,j)>

For example, a display element having a function of controlling reflection or transmission of light can be used as the display element 750(i,j) or the like. For example, a combined structure of a liquid crystal element and a polarizing plate, a shutter-type micro electro mechanical systems (MEMS) display element, an optical-interference-type MEMS element, or a display element employing a microcapsule method, an electrophoretic method, an electrowetting method, an Electronic Liquid Powder (registered trademark) method, or the like can be used. The use of a reflective display element can reduce the power consumption of a display device. Specifically, a reflective liquid crystal display element can be used as the display element 750.

Specifically, a liquid crystal element that can be driven in any of the following driving modes can be used: an in-plane-switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

For example, thermotropic liquid crystal, low-molecular liquid crystal, high-molecular liquid crystal, polymer dispersed liquid crystal, ferroelectric liquid crystal, antiferroelectric liquid crystal, or the like can be used. A liquid crystal material that exhibits a cholesteric phase, a smectic phase, a cubic phase, a chiral nematic phase, an isotropic phase, or the like can be used. Alternatively, a liquid crystal material that exhibits a blue phase can be used.

<First Electrode 751(i,j)>

For example, the material of the wiring or the like can be used for the first electrode 751(i,j). Specifically, a reflective film can be used for the first electrode 751(i,j).

<Reflective Film>

For example, a material reflecting visible light can be used for the reflective film. Specifically, a material containing silver can be used for the reflective film. For example, a material containing silver, palladium, and the like or a material containing silver, copper, and the like can be used for the reflective film.

The reflective film reflects, for example, light passing through the layer 753 containing a liquid crystal material. This allows the display element 750(i,j) to serve as a reflective liquid crystal element. Alternatively, a material with an uneven surface can be used for the reflective film. In that case, incident light can be reflected in various directions so that a white image can be displayed.

Note that one embodiment of the present invention is not limited to the structure in which the first electrode 751(i,j) is used as the reflective film. For example, a structure in which the reflective film is positioned between the layer 753 containing a liquid crystal material and the first electrode 751(i,j) can be used. Alternatively, a structure in which the first electrode 751(i,j) having light-transmitting properties is positioned between the reflective film and the layer 753 containing a liquid crystal material can be used.

<Opening 751H>

If the ratio of the total area of the opening 751H to the total area except for the opening is too high, display performed using the display element 750(i,j) is dark. If the ratio of the total area of the opening 751H to the total area except for the opening is too low, display performed using the display element 650(i,j) is dark.

If the area of the opening 751H in the reflective film is too small, light emitted from the display element 650 is not efficiently extracted.

The opening 751H can have a polygonal shape, a quadrangular shape, an elliptical shape, a circular shape, a cross-like shape, or the like. The opening 751H can also have a stripe shape, a slit-like shape, or a checkered pattern. The size of the opening 751H may be changed in accordance with the kind of light emitted from the display element 650. The opening 751H may be positioned close to an adjacent pixel. Preferably, the opening 751H is positioned close to another pixel having a function of emitting light of the same color. In that case, a phenomenon in which light emitted from the display element 650 enters a coloring film of the adjacent pixel (also called crosstalk) can be suppressed.

<Second Electrode 752>

For example, a material having a visible-light transmitting property and conductivity can be used for the second electrode 752.

For example, conductive oxide, a metal film thin enough to transmit light, or a metal nanowire can be used as the second electrode 752.

Specifically, conductive oxide containing indium can be used for the second electrode 752. Alternatively, a metal thin film with a thickness of greater than or equal to 1 nm and less than or equal to 10 nm can be used for the second electrode 752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<Alignment Films AF1 and AF2>

For example, the alignment films AF1 and AF2 can be formed using a material containing polyimide or the like. Specifically, it is possible to use a material formed to be aligned in a predetermined direction by a rubbing process or an optical alignment process.

For example, a film containing soluble polyimide can be used as the alignment film AF1 or AF2.

<Light-Blocking Film BM>

A material that prevents light transmission can be used for the light-blocking film BM. Thus, the light-blocking film BM can be used as, for example, a black matrix.

<Insulating Film 771>

For example, polyimide, an epoxy resin, an acrylic resin, or the like can be used for the insulating film 771.

<Functional Film 770P>

For example, a polarizing plate, a retardation plate, a diffusing film, an antireflective film, a condensing film, or the like can be used as the functional film 770P. Alternatively, a polarizing plate containing a dichromatic pigment can be used as the functional film 770P.

Alternatively, an antistatic film preventing attachment of dust, a water-repellent film suppressing attachment of stain, a hard coat film suppressing generation of a scratch in use, or the like can be used as the functional film 770P.

<Display Element 650(i,j)>

For example, a light-emitting element can be used as the display element 650(i,j). Specifically, an organic electroluminescence element, an inorganic electroluminescence element, a light-emitting diode (LED), a quantum-dot light-emitting diode (QLED), or the like can be used as the display element 650(i,j).

For example, a stack body for emitting blue light, green light, or red light can be used as the layer 653(j) containing a light-emitting organic compound.

For example, a stack body extending linearly in a column direction along a signal line S_R(j) can be used as a layer 653R(j) containing a light-emitting organic compound. In addition, a stack body that extends linearly in the column direction along a signal line S_G(j) and emits light of a color different from the color of the layer 653R(j) containing a light-emitting organic compound can be used as a layer 653G(j) containing a light-emitting organic compound.

Alternatively, for example, a stack body for emitting white light can be used as the layer 653(j) containing a light-emitting organic compound and a layer 653(j+1) containing a light-emitting organic compound. Specifically, a stack of a layer containing a light-emitting organic compound containing a fluorescent material that emits blue light, and a layer containing materials that are other than the fluorescent material and emit green light and red light, or a layer containing a material that is other than the fluorescent material and emits yellow light can be used as the layer 653(j) containing a light-emitting organic compound and the layer 653(j+1) containing a light-emitting organic compound.

In order to obtain light with a required wavelength, a coloring film containing an organic compound may be provided between the insulating film 621 and the alignment film AF1 to overlap with the opening 751H. The coloring film containing an organic compound has a region overlapping with the display element 750(i,j). The light-blocking film BM has an opening in a region overlapping with the display element 750(i,j).

For example, a material that can be used for the wiring or the like can be used for the third electrode 651(i,j) or the fourth electrode 652.

For example, a material that transmits visible light and is selected from the materials used for the wiring or the like can be used for the third electrode 651(i,j).

Specifically, conductive oxide, indium-containing conductive oxide, indium oxide, indium tin oxide, indium zinc oxide, zinc oxide, zinc oxide to which gallium is added, or the like can be used for the third electrode 651(i,j). Alternatively, a metal film that is thin enough to transmit light can be used as the third electrode 651(i,j).

For example, a material that reflects visible light and is selected from the materials used for the wiring or the like can be used for the fourth electrode 652.

The structures and methods described in this embodiment can be combined as appropriate with any of the structures and methods described in the other embodiments.

Embodiment 4

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. That is, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis aligned crystal (CAAC)" or "cloud-aligned composite (CAC)" might be stated. CAAC refers to an example of a crystal structure, and CAC refers to an example of a function or a material composition.

In this specification and the like, a CAC-OS or a CAC metal oxide has a conducting function in part of a material and has an insulating function in another part of the material; as a whole, the CAC-OS or the CAC metal oxide functions as a semiconductor. In the case where the CAC-OS or the CAC metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or the CAC metal oxide, separation of the functions can maximize each function.

The CAC-OS or the CAC metal oxide includes components having different bandgaps. For example, the CAC-OS or the CAC metal oxide includes a component having a wide gap due to an insulating region and a component having a narrow gap due to a conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the CAC-OS or the CAC metal oxide is used in a channel region of a transistor, high current drive capability in the on state of the transistor, that is, high on-state current and high field-effect mobility, can be obtained.

In other words, a CAC-OS or a CAC-metal oxide can be called a matrix composite or a metal matrix composite.

<Composition of CAC-OS>

The composition of a CAC-OS that can be used for a transistor disclosed in one embodiment of the present invention is described below.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed in regions each having a size of greater than or equal to 0.5 nm and less than or equal to 10 nm, preferably greater than or equal to 1 nm and less than or equal to 2 nm, or a similar size and the regions including the one or more metal elements are mixed is referred to as a mosaic pattern or a patch-like pattern.

Note that the oxide semiconductor preferably contains at least indium. In particular, indium and zinc are preferably contained. In addition, one or more elements selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, or the like may be contained.

As an example of the CAC-OS, an In—Ga—Zn oxide with the CAC composition (such an In—Ga—Zn oxide may be particularly referred to as CAC-IGZO) is described. The CAC-IGZO has a composition with a mosaic pattern in which materials are separated into indium oxide ($InO_{X1}$, where X1 is a real number greater than 0) or indium zinc oxide ($In_{X2}Zn_{Y2}O_{Z2}$, where X2, Y2, and Z2 are each a real number greater than 0) and gallium oxide ($GaO_{X3}$, where X3 is a real number greater than 0) or gallium zinc oxide ($Ga_{X4}Zn_{Y4}O_{Z4}$, where X4, Y4, and Z4 are each a real number greater than 0), for example. Furthermore, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is higher than the atomic ratio of In to the element M in a second region, the first region has higher In concentration than the second region.

Note that a compound containing In, Ga, Zn, and O is also commonly known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The crystalline compound has a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In part of the material composition of a CAC-OS containing In, Ga, Zn, and O, nanoparticle regions including Ga as a main component and nanoparticle regions including In as a main component are observed. These nanoparticle regions are randomly dispersed in a mosaic pattern. Therefore, the crystal structure is a secondary element for the CAC-OS.

Note that the CAC-OS does not include a layered structure of two or more films with different compositions. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In part of the composition of a CAC-OS that contains, instead of gallium, one or more metal elements selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, or the like, nanoparticle regions including the one or more metal elements as a main component and nanoparticle regions including In as a main component are observed. These nanoparticle regions are randomly dispersed in a mosaic pattern.

The CAC-OS can be formed by sputtering under conditions where a substrate is not heated intentionally, for example. In the case where the CAC-OS is formed by sputtering, one or more gases selected from an inert gas (typically, argon), an oxygen gas, and a nitrogen gas may be used as a deposition gas. The percentage of the oxygen gas flow rate in the total flow rate of the deposition gas at the time of deposition is preferably as low as possible; for example, the percentage of the oxygen gas flow rate is preferably higher than or equal to 0% and lower than 30%, more preferably higher than or equal to 0% and lower than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS that is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in the plan-view direction and the cross-sectional direction.

For example, energy dispersive X-ray spectroscopy (EDX) is used to obtain EDX mapping, and according to the EDX mapping, the CAC-OS of the In—Ga—Zn oxide has a composition in which the region including $GaO_{X3}$ as a main component and the region including $In_{X2}Zn_{Y2}O_{Z2}$ or $InO_{X1}$ as a main component are unevenly distributed and mixed.

The CAC-OS has a structure and characteristics different from those of an IGZO compound in which metal elements are evenly distributed. That is, in the CAC-OS, regions including $GaO_{X3}$ or the like as a main component and regions including $In_{X2}Zn_{Y2}O_{Z2}$ or $InO_{X1}$ as a main component are phase-separated from each other in a mosaic pattern.

The conductivity of the region including $In_{X2}Zn_{Y2}O_{Z2}$ or $InO_{X1}$ as a main component is higher than that of the region including $GaO_{X3}$ or the like as a main component. In other words, when carriers flow through the region including $In_{X2}Zn_{Y2}O_{Z2}$ or $InO_{X1}$ as a main component, the oxide semiconductor exhibits conductivity. Accordingly, when the regions including $In_{X2}Zn_{Y2}O_{Z2}$ or $InO_{X1}$ as a main component are distributed in the oxide semiconductor like a cloud, high field-effect mobility ($\mu$) can be achieved.

In contrast, the insulating property of the region including $GaO_{X3}$ or the like as a main component is higher than that of the region including $In_{X2}Zn_{Y2}O_{Z2}$ or $InO_{X1}$ as a main component. In other words, when the regions including $GaO_{X3}$ or the like as a main component are distributed in the oxide semiconductor, leakage current can be reduced and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, so that high on-state current ($I_{on}$) and high field-effect mobility ($\mu$) can be achieved.

A semiconductor element including a CAC-OS has high reliability. Thus, the CAC-OS is suited for a variety of semiconductor devices typified by a display.

At least part of this embodiment can be implemented in combination with any of the other embodiments described in this specification as appropriate.

Embodiment 5

An application example of a display module including the display panel described in any of the above embodiments is described with reference to FIG. 16.

Figure 16:
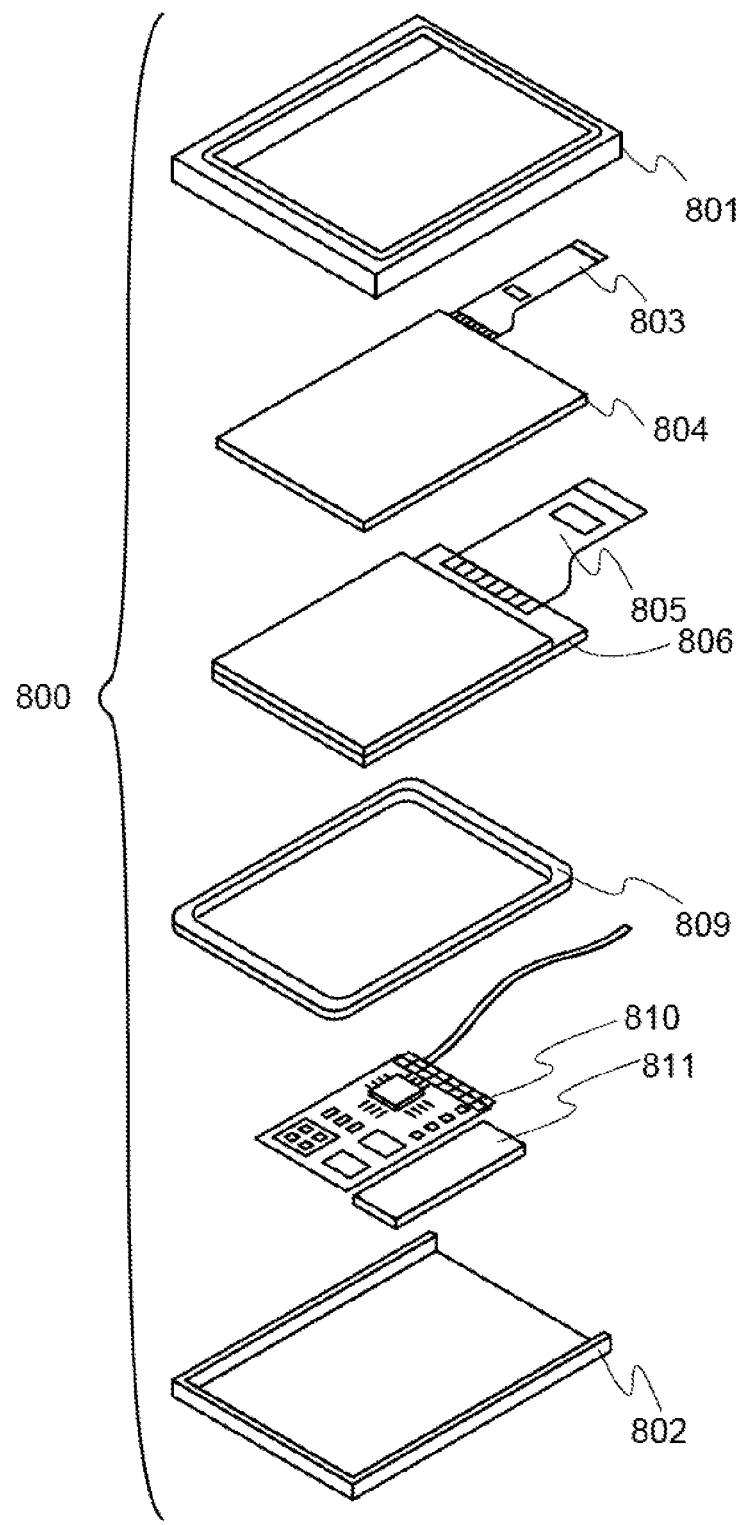
FIG. 16 illustrates an example of a display module.

In a display module 800 in FIG. 16, a touch panel 804 connected to an FPC 803, a display panel 806 connected to an FPC 805, a frame 809, a printed circuit board 810, and a battery 811 are provided between an upper cover 801 and a lower cover 802. Note that the battery 811, the touch panel 804, and the like are not provided in some cases.

The display panel described in any of the above embodiments can be used as the display panel 806 in FIG. 16.

The shapes and sizes of the upper cover 801 and the lower cover 802 can be changed as appropriate in accordance with the sizes of the touch panel 804 and the display panel 806.

The touch panel 804 can be a resistive touch panel or a capacitive touch panel and can overlap with the display panel 806. It is also possible to provide a touch panel function for a counter substrate (sealing substrate) of the display panel 806. Alternatively, an optical sensor may be provided in each pixel of the display panel 806 so that an optical touch panel can be obtained. Alternatively, an electrode for a touch sensor may be provided in each pixel of the display panel 806 so that a capacitive touch panel can be obtained. In such a case, the touch panel 804 can be omitted.

The upper cover 801 may include an optical path. Light delivered from a light source mounted on the printed circuit board 810 passes through the optical path of the upper cover 801 and is emitted from one side of the upper cover. Then, whether there is light incident on the optical path of another side of the upper cover is determined by an optical sensor mounted on the printed circuit board 810. Thus, touch of a screen with a finger, a stylus, or the like can be sensed. In that case, the display panel 806 or the counter substrate of the display panel 806 does not have to have a touch panel function; furthermore, the touch panel 804 can be omitted.

Figure 17A:
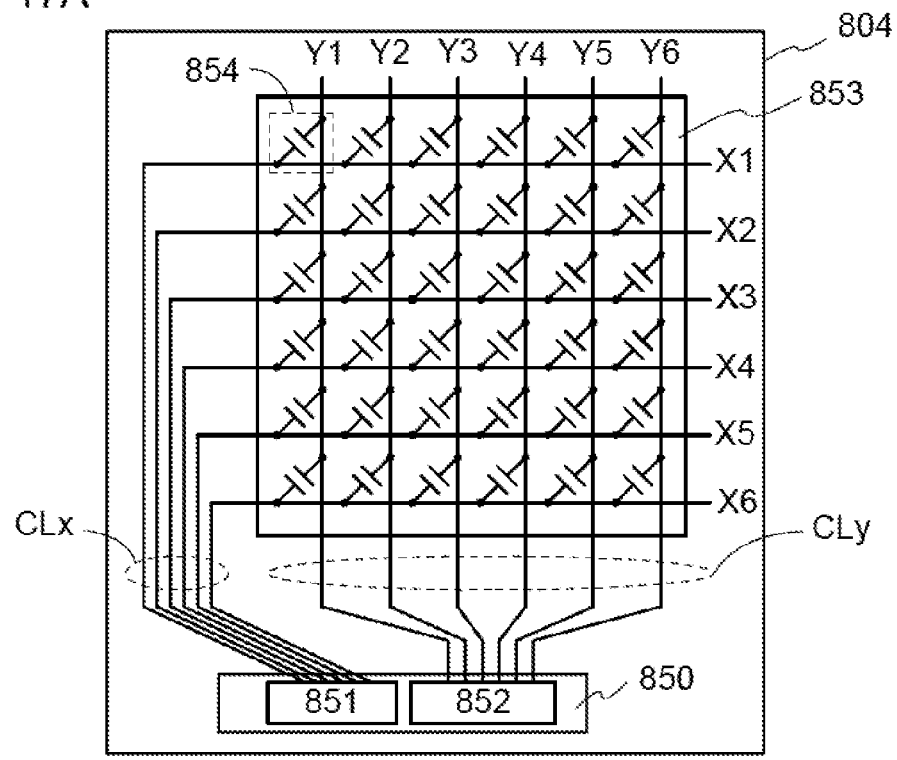
FIGS. 17A and 17B are schematic diagrams each illustrating a structure example of a touch panel.

FIG. 17A is a schematic diagram illustrating a structure example where the touch panel 804 is a mutual capacitive touch sensor. In FIG. 17A, as an example, six wirings X1 to X6 represent wirings CLx to which pulse voltage is applied, and six wirings Y1 to Y6 represent wirings CLy that detect changes in current. The number of wirings is not limited to those illustrated in FIG. 17A. FIG. 17A also illustrates a capacitor 854 that is formed with the wiring CLx and the wiring CLy overlapping with each other or being provided close to each other.

The wirings CLx and the wirings CLy are electrically connected to an IC 850. The IC 850 includes a driver circuit 851 and a detection circuit 852.

The driver circuit 851 is, for example, a circuit for sequentially supplying pulse voltage to the wirings X1 to X6. By supplying pulse voltage to the wirings X1 to X6, an electric field is generated between the wirings CLx and CLy of the capacitors 854. With pulse voltage, current flows through the capacitor 854. An electric field generated between the wirings is changed by being blocked, for example, when a finger, a stylus, or the like touches the touch sensor. That is, for example, by touch with a finger, a stylus, or the like, the capacitance of the capacitor 854 is changed. By utilizing the change in capacitance caused by touch with a finger, a stylus, or the like as described above, the approach or contact of an object can be detected.

The detection circuit 852 is a circuit for detecting changes in current flowing through the wirings Y1 to Y6 that are caused by the changes in capacitance of the capacitors 854. No change in the current values of the wirings Y1 to Y6 is detected when there is no approach or contact of an object, whereas a decrease in the current value is detected when capacitance is decreased owing to the approach or contact of an object. In order to detect changes in current, the total amount of current may be detected. In that case, an integrator circuit or the like may be used to detect the total amount of current. Alternatively, the peak value of current may be detected. In that case, current may be converted into voltage, and the peak value of voltage may be detected.

Although the driver circuit 851 and the detection circuit 852 are formed in one IC in FIG. 17A, the driver circuit 851 and the detection circuit 852 may be formed in different ICs. The detection circuit 852 easily malfunctions due to the influence of noise, while the driver circuit 851 might be a generation source of noise. The detection circuit 852 can be prevented from malfunctioning by being formed in an IC different from an IC in which the driver circuit 851 is formed.

The driver circuit 851, the detection circuit 852, and a driver circuit of the display panel 806 may be formed in one IC, which results in a reduction in proportion of the cost of an IC in the cost of the whole display module.

Figure 17B:
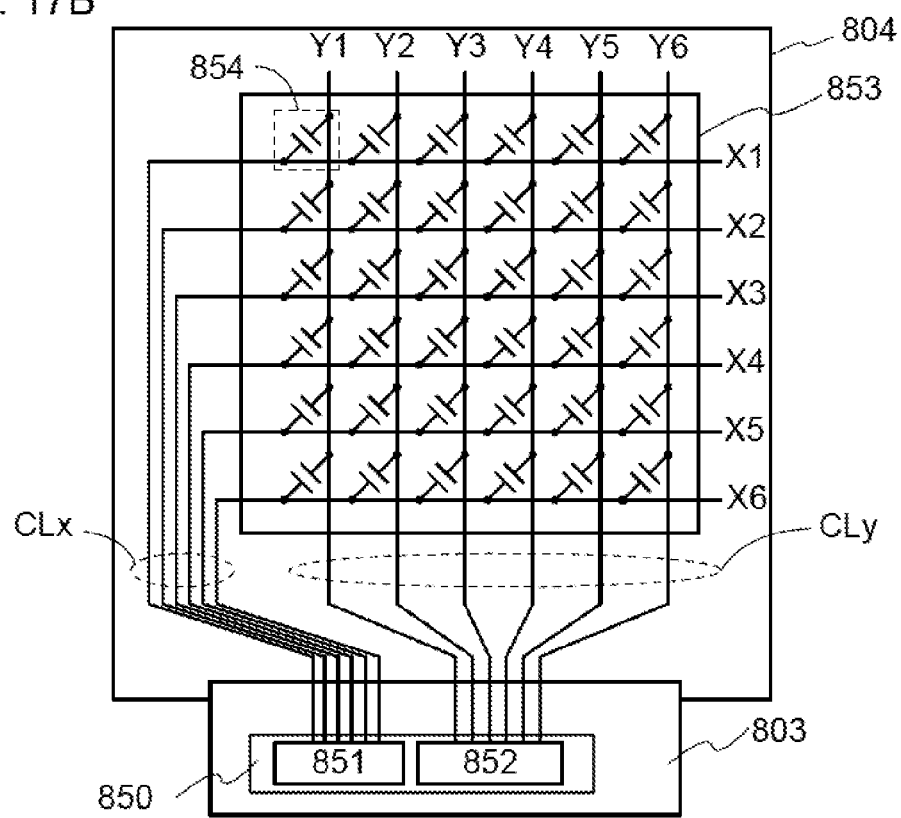

The IC 850 is provided in the touch panel 804 in FIG. 17A; however, the IC 850 may be provided in the FPC 803. FIG. 17B is a schematic view illustrating the case.

FIG. 16 is described again.

The frame 809 protects the display panel 806 and functions as an electromagnetic shield for blocking electromagnetic waves generated by the operation of the printed circuit board 810. The frame 809 may also function as a radiator plate.

The printed circuit board 810 includes a power supply circuit and a signal processing circuit for outputting a video signal and a clock signal. Furthermore, the printed circuit board 810 may include a light source and an optical sensor for touch sensing. The wavelength of light from the light source is preferably longer than 780 nm, more preferably longer than 1.6 μm. The optical sensor has a function of sensing light having a wavelength in a particular range. As a power source for supplying power to the power supply circuit, an external commercial power source or a separate power source using the battery 811 may be used. The battery 811 can be omitted in the case of using a commercial power source.

The display module 800 may be additionally provided with a member such as a polarizing plate, a retardation plate, or a prism sheet.

Embodiment 6

In this embodiment, electronic devices and display devices in one embodiment of the present invention are described with reference to drawings.

A light-emitting device, a display device, a semiconductor device, or the like that is thin and lightweight and has a curved surface or flexibility can be manufactured by using a high-definition display portion including subpixels in one embodiment of the present invention. By using the light-emitting device, the display device, the semiconductor device, or the like to which one embodiment of the present invention is applied, an electronic device or a display device that is thin and lightweight and has a curved surface or flexibility can be manufactured.

Examples of electronic devices include a television set (also referred to as a television or a television receiver), a monitor of a computer or the like, a camera such as a digital camera or a digital video camera, a digital photo frame, a mobile phone (also referred to as a cellular phone or a mobile phone device), a portable game machine, a portable information terminal, an audio reproducing device, and a large-sized game machine such as a pachinko machine.

The electronic device or the display device in one embodiment of the present invention has flexibility and therefore can be incorporated along a curved inside/outside wall surface of a house or a building or a curved interior/exterior surface of an automobile.

The electronic device in one embodiment of the present invention may include a secondary battery. It is preferable that the secondary battery be capable of being charged by contactless power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device in one embodiment of the present invention may include an antenna. When the antenna receives a signal, the electronic device can display an image, data, or the like on a display portion. When the electronic device includes the antenna and a secondary battery, the antenna may be used for contactless power transmission.

FIGS. 18A, 18B, 18C1, 18C2, 18D, and 18E illustrate examples of electronic devices each including a display portion 7000 with a curved surface. The display surface of the display portion 7000 is curved, and images can be displayed on the curved display surface. The display portion 7000 may be flexible. The use of the display device 10 in FIG. 3 or the display device 700 in FIG. 7 can provide a low-power electronic device with high visibility.

The display portion 7000 includes the light-emitting device, display device, or input/output device manufactured using the high-definition display portion including subpixels in one embodiment of the present invention.

One embodiment of the present invention can provide an electronic device having a curved display portion.

FIG. 18A illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 in FIG. 18A includes a touch sensor in the display portion 7000. Operations such as making a call and inputting a character can be performed by touch on the display portion 7000 with a finger, a stylus, or the like.

With the operation buttons 7103, the power can be turned on or off. In addition, types of images displayed on the display portion 7000 can be switched; for example, switching images from a mail creation screen to a main menu screen can be performed.

FIG. 18B illustrates an example of a television set. In a television set 7200, the display portion 7000 is incorporated in a housing 7201. Here, the housing 7201 is supported by a stand 7203.

The television set 7200 in FIG. 18B can be operated with an operation switch of the housing 7201 or a separate remote control 7211. The display portion 7000 may include a touch sensor, and can be operated by touch on the display portion 7000 with a finger or the like. The remote control 7211 may include a display portion for displaying data output from the remote control 7211. With operation keys or a touch panel of the remote control 7211, channels and volume can be controlled and images displayed on the display portion 7000 can be controlled.

Note that the television set 7200 includes a receiver, a modem, or the like. A general television broadcast can be received with the receiver. When the television set is connected to a communication network with or without wires via the modem, one-way (from a transmitter to a receiver) or two-way (between a transmitter and a receiver or between receivers) data communication can be performed.

FIGS. 18C1, 18C2, 18D, and 18E illustrate examples of portable information terminals. Each of the portable information terminals includes a housing 7301 and the display portion 7000. Each of the portable information terminals may further include an operation button, an external connection port, a speaker, a microphone, an antenna, a battery, or the like. The display portion 7000 includes a touch sensor. Operation of the portable information terminal can be performed by touch on the display portion 7000 with a finger, a stylus, or the like.

FIG. 18C1 is a perspective view of a portable information terminal 7300. FIG. 18C2 is a top view of the portable information terminal 7300. FIG. 18D is a perspective view of a portable information terminal 7310. FIG. 18E is a perspective view of a portable information terminal 7320.

Each of the portable information terminals illustrated in this embodiment functions as, for example, one or more of a telephone set, a notebook, and an information browsing system. Specifically, each of the portable information terminals can be used as a smartphone. Each of the portable information terminals illustrated in this embodiment is capable of executing, for example, a variety of applications such as mobile phone calls, e-mailing, reading and editing texts, music reproduction, Internet communication, and a computer game.

The portable information terminals 7300, 7310, and 7320 can each display characters, image information, and the like on its plurality of surfaces. For example, as illustrated in FIGS. 18C1 and 18D, three operation buttons 7302 can be displayed on one surface, and information 7303 indicated by a rectangle can be displayed on another surface. FIGS. 18C1 and 18C2 illustrate an example in which information is displayed at the top surface of the portable information terminal. FIG. 18D illustrates an example in which information is displayed on the side surface of the portable information terminal. Information may be displayed on three or more surfaces of the portable information terminal. FIG. 18E illustrates an example in which information 7304, information 7305, and information 7306 are displayed on different surfaces.

Examples of the information include notification from a social networking service (SNS); display indicating reception of an e-mail, an incoming call, or the like; the subject of an e-mail or the like; the sender of an e-mail or the like; the date; the time; remaining battery; and the reception strength of an antenna. Alternatively, the operation button, an icon, or the like may be displayed instead of the information.

For example, a user of the portable information terminal 7300 can see the display (here, the information 7303) with the portable information terminal 7300 put in a breast pocket of his/her clothes.

Specifically, a caller's phone number, name, or the like of an incoming call is displayed in the position that can be seen from above the portable information terminal 7300. Thus, the user can see the display without taking out the portable information terminal 7300 from the pocket and decide whether to answer the call.

FIGS. 19A1, 19A2, 19B, 19C, 19D, 19E, 19F, 19G, 19H, and 19I each illustrate an example of a portable information terminal including a display portion 7001 having flexibility.

The display portion 7001 includes the light-emitting device, display device, or input/output device manufactured using the high-definition display portion including subpixels in one embodiment of the present invention. For example, a light-emitting device, a display device, or an input/output device that can be bent with a curvature radius of greater than or equal to 0.01 mm and less than or equal to 150 mm can be used. The display portion 7001 may include a touch sensor so that the portable information terminal can be operated by touch on the display portion 7001 with a finger or the like.

One embodiment of the present invention can provide an electronic device including a flexible display portion. The use of the display device 10 in FIG. 3 or the display device 700 in FIG. 7 can provide a low-power electronic device with high visibility. One embodiment of the present invention is preferable for an electronic device that often displays a still image.

FIGS. 19A1 and 19A2 are a perspective view and a side view, respectively, illustrating an example of the portable information terminal. A portable information terminal 7500 includes a housing 7501, the display portion 7001, a display portion tab 7502, operation buttons 7503, and the like.

The portable information terminal 7500 includes a rolled flexible display portion 7001 in the housing 7501. The display portion 7001 can be pulled out by using the display portion tab 7502.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal and power can be directly supplied from the outside with wires.

With the operation buttons 7503, power ON/OFF, switching of displayed videos, and the like can be performed. Although FIGS. 19A1, 19A2, and 19B illustrate an example in which the operation buttons 7503 are positioned on a side surface of the portable information terminal 7500, one embodiment of the present invention is not limited thereto. The operation buttons 7503 may be placed on a display surface (front surface) or a rear surface of the portable information terminal 7500.

FIG. 19B illustrates the portable information terminal 7500 in a state where the display portion 7001 is pulled out. Images can be displayed on the display portion 7001 in this state. In addition, the portable information terminal 7500 may perform different displays in the state where part of the display portion 7001 is rolled as illustrated in FIG. 19A1 and in the state where the display portion 7001 is pulled out as illustrated in FIG. 19B. For example, in the state illustrated in FIG. 19A1, the rolled portion of the display portion 7001 is put in a non-display state, which results in a reduction in power consumption of the portable information terminal 7500.

Note that a reinforcement frame may be provided for a side portion of the display portion 7001 so that the display portion 7001 has a flat display surface when pulled out.

Note that in addition to this structure, a speaker may be provided for the housing so that sound is output with an audio signal received together with a video signal.

FIGS. 19C to 19E illustrate an example of a foldable portable information terminal. FIG. 19C illustrates a portable information terminal 7600 that is opened. FIG. 19D illustrates the portable information terminal 7600 that is being opened or being folded. FIG. 19E illustrates the portable information terminal 7600 that is folded. The portable information terminal 7600 is highly portable when folded, and is highly browsable when opened because of a large seamless display portion.

The display portion 7001 is supported by three housings 7601 joined together by hinges 7602. By folding the portable information terminal 7600 at a connection portion between two housings 7601 with the hinges 7602, the portable information terminal 7600 can be reversibly changed in shape from an opened state to a folded state.

FIGS. 19F and 19G illustrate an example of a foldable portable information terminal. FIG. 19F illustrates a portable information terminal 7650 that is folded so that the display portion 7001 is on the inside. FIG. 19G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside; thus, contamination of or damage to the display portion 7001 can be suppressed.

FIG. 19H illustrates an example of a flexible portable information terminal. A portable information terminal 7700 includes a housing 7701 and the display portion 7001. The portable information terminal 7700 may further include buttons 7703a and 7703b which serve as input means, speakers 7704a and 7704b which serve as sound output means, an external connection port 7705, a microphone 7706, or the like. A flexible battery 7709 can be included in the portable information terminal 7700. The battery 7709 may be provided to overlap with the display portion 7001, for example.

The housing 7701, the display portion 7001, and the battery 7709 are flexible. Thus, it is easy to curve the portable information terminal 7700 into a desired shape and to twist the portable information terminal 7700. For example, the portable information terminal 7700 can be folded so that the display portion 7001 is on the inside or on the outside. The portable information terminal 7700 can be used in a rolled state. Since the housing 7701 and the display portion 7001 can be transformed freely in this manner, the portable information terminal 7700 is less likely to be broken even when the portable information terminal 7700 falls down or unintended external stress is applied to the portable information terminal 7700.

The portable information terminal 7700 is lightweight and therefore can be used conveniently in various situations. For example, the portable information terminal 7700 can be used in a state where the upper portion of the housing 7701 is suspended by a clip or the like, or in a state where the housing 7701 is fixed to a wall by magnets or the like.

FIG. 19I illustrates an example of a wrist-watch-type portable information terminal. A portable information terminal 7800 includes a band 7801, the display portion 7001, an input/output terminal 7802, operation buttons 7803, and the like. The band 7801 functions as a housing. A flexible battery 7805 can be included in the portable information terminal 7800. The battery 7805 may be provided to overlap with the display portion 7001 or the band 7801, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of a silent mode, and setting and cancellation of a power saving mode can be performed. For example, the functions of the operation buttons 7803 can be set freely by an operating system incorporated in the portable information terminal 7800.

By touch on an icon 7804 displayed on the display portion 7001 with a finger or the like, an application can be started.

The portable information terminal 7800 can employ near field communication conformable to a communication standard. In that case, for example, mutual communication between the portable information terminal 7800 and a headset capable of wireless communication enables hands-free calling.

The portable information terminal 7800 may include the input/output terminal 7802. In the case where the input/output terminal 7802 is included in the portable information terminal 7800, data can be directly transmitted to and received from another information terminal via a connector. Charging through the input/output terminal 7802 is also possible. Note that charging of the portable information terminal illustrated in this embodiment can be performed by contactless power transmission without using the input/output terminal.

Figure 20A:
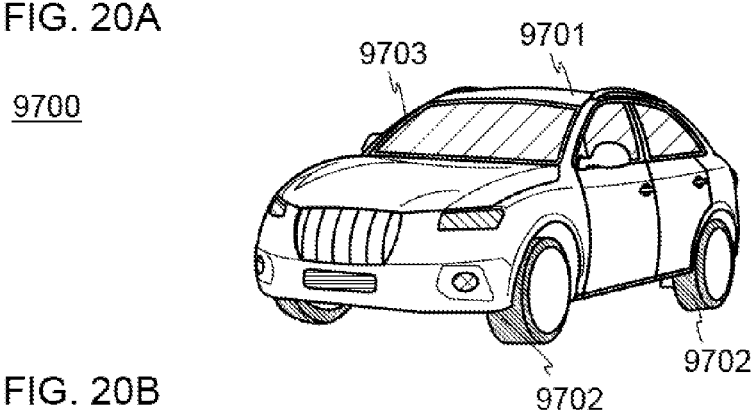
FIGS. 20A to 20E each illustrate an example of an electronic device.
Figure 20B:
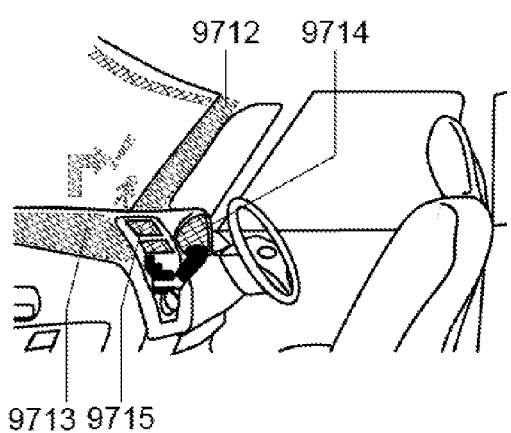

FIG. 20A is an external view of an automobile 9700. FIG. 20B illustrates a driver's seat of the automobile 9700. The automobile 9700 includes a car body 9701, wheels 9702, a windshield 9703, and the like. The light-emitting device, display device, input/output device, or the like manufactured using one embodiment of the present invention can be used in a display portion or the like of the automobile 9700. For example, the light-emitting device or the like to which one embodiment of the present invention is applied can be used in display portions 9710 to 9715 illustrated in FIG. 20B.

The display portion 9712 is a display device provided on a pillar portion. For example, the display portion 9712 can compensate for view hindered by the pillar portion by showing an image taken by an imaging unit provided on the car body. The display portion 9713 is a display device provided on a dashboard. For example, the display portion 9713 can compensate for view hindered by the dashboard by showing an image taken by an imaging unit provided on the car body. That is, showing an image taken by an imaging unit provided on the outside of the car body leads to elimination of blind spots and enhancement of safety. In addition, showing an image to compensate for an area which a driver cannot see makes it possible for the driver to confirm safety easily and comfortably. The display device 10 in FIG. 3 and the display device 700 in FIG. 7 are preferable because they have high visibility by the reduction in flickers.

Figure 20C:
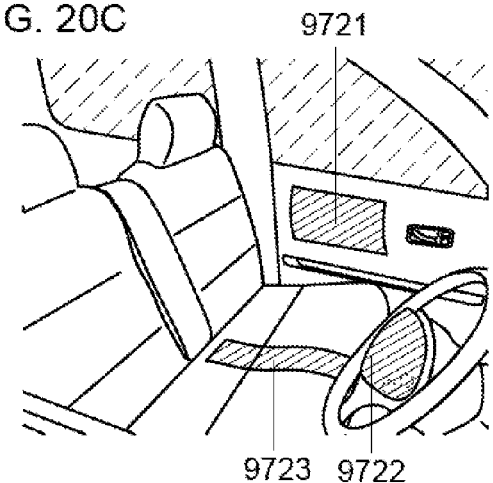

FIG. 20C illustrates the inside of an automobile in which a bench seat is used as a driver seat and a front passenger seat. A display portion 9721 is a display device provided in a door portion. For example, the display portion 9721 can compensate for view hindered by the door portion by showing an image taken by an imaging unit provided on the car body. A display portion 9722 is a display device provided in a steering wheel. A display portion 9723 is a display device provided in the middle of a seating face of the bench seat. Note that the display device can be used as a seat heater by providing the display device on the seating face or backrest and by using heat generated by the display device as a heat source.

The display portion 9714, the display portion 9715, and the display portion 9722 can provide various kinds of information such as navigation data, a speedometer, a tachometer, a mileage, a fuel meter, a gearshift indicator, an air-condition setting. The content, layout, or the like of the display on the display portions can be changed as appropriate by a user. The information listed above can also be displayed on the display portions 9712, 9713, 9721, and 9723. The display portions 9713 to 9715 and 9721 to 9723 can also be used as lighting devices.

The light-emitting device, display device, or input/output device may include a flat display portion.

Figure 20D:
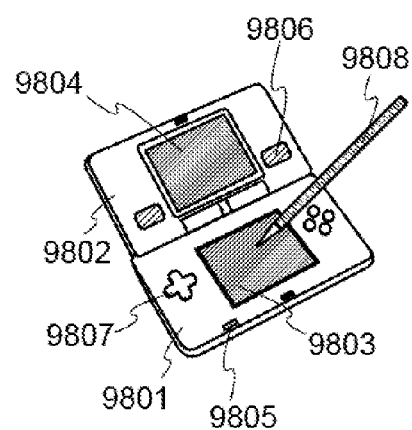

A portable game machine in FIG. 20D includes a housing 9801, a housing 9802, a display portion 9803, a display portion 9804, a microphone 9805, a speaker 9806, an operation key 9807, a stylus 9808, and the like.

The portable game machine in FIG. 20D includes two display portions 9803 and 9804. Note that the number of display portions included in an electronic device in one embodiment of the present invention is not limited to two and can be one or three or more. In the case where an electronic device includes a plurality of display portions, the electronic device includes a light-emitting device, a display device, or an input/output device, in which one embodiment of the present invention is applied to at least one display portion, or the like.

Figure 20E:
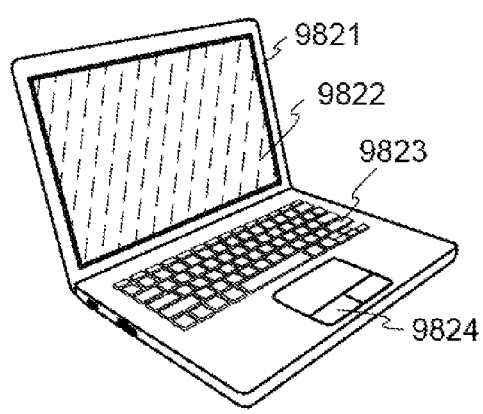

FIG. 20E illustrates a laptop, which includes a housing 9821, a display portion 9822, a keyboard 9823, a pointing device 9824, and the like.

The structures, methods, driving timing described in this embodiment can be combined with any of those described in the other embodiments as appropriate.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, each of X and Y denotes an object (e.g., a device, an element, a circuit, a wiring, an electrode, a terminal, a conductive film, or a layer).

Examples of the case where X and Y are directly connected include the case where an element that enables electrical connection between X and Y (e.g., a transistor, a capacitor, an inductor, a resistor, a diode, a display element, a light-emitting element, or a load) is not connected between X and Y, and the case where X and Y are connected without the element that enables electrical connection between X and Y provided therebetween.

For example, in the case where X and Y are electrically connected, one or more elements that enable electrical connection between X and Y (e.g., a transistor, a capacitor, an inductor, a resistor, a diode, a display element, a light-emitting element, or a load) can be connected between X and Y. Note that the transistor is controlled to be turned on or off. That is, the transistor is conducting or not conducting (is turned on or off) to determine whether current flows therethrough or not. Alternatively, the transistor has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a D/A converter circuit, an A/D converter circuit, or a gamma correction circuit; a voltage level converter circuit such as a power supply circuit (e.g., a step-up circuit or a step-down circuit) or a level shifter circuit for changing the voltage level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a storage circuit; or a control circuit) can be connected between X and Y. Note that for example, in the case where a signal output from X is transmitted to Y even when another circuit is provided between X and Y, X and Y are functionally connected. The case where X and Y are functionally connected includes the case where X and Y are directly connected and X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the explicit description "X and Y are connected."

For example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to part of Z1 and another part of Z1 is directly connected to X while a drain (or a second terminal or the like) of the transistor is directly connected to part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in that order," "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in that order," and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are connected in that order." When the connection order in a circuit structure is defined by an expression similar to the above examples, a source (or a first terminal or the like) and a drain (or a second terminal or the like) of a transistor can be distinguished from each other to specify the technical scope.

Other examples of the expressions include "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path." It is also possible to use the expression "a source (or a first terminal or the like) of a transistor is electrically connected to X through at least Z1 on a first connection path, the first connection path does not include a second connection path, the second connection path includes a connection path through the transistor, a drain (or a second terminal or the like) of the transistor is electrically connected to Y through at least Z2 on a third connection path, and the third connection path does not include the second connection path." Still another example of the expressions is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor." When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film functions as the wiring and the electrode. Thus, the term "electrical connection" in this specification also means such a case where one conductive film has functions of a plurality of components.

This application is based on Japanese Patent Application Serial No. 2016-137704 filed with Japan Patent Office on Jul. 12, 2016, the entire contents of which are hereby incorporated by reference.

What is claimed is:

1. A display device comprising:
a signal line;
a first scan line;
a second scan line; and
a pixel circuit,
wherein the pixel circuit includes a light-emitting element, a first transistor, a second transistor, a third transistor, and a capacitor,
wherein a gate of the first transistor is electrically connected to the first scan line,
wherein one of a source and a drain of the first transistor is electrically connected to the signal line,
wherein the other of the source and the drain of the first transistor is electrically connected to one of a source and a drain of the third transistor,
wherein a gate of the second transistor is electrically connected to the first scan line,
wherein one of a source and a drain of the second transistor is electrically connected to the second scan line,
wherein the other of the source and the drain of the second transistor is electrically connected to a gate of the third transistor,
wherein one electrode of the capacitor is electrically connected to the gate of the third transistor,
wherein the other electrode of the capacitor is electrically connected to the one of the source and the drain of the third transistor,
wherein the one of the source and the drain of the third transistor is electrically connected to the one electrode of the light-emitting element,
wherein the first scan line is configured to output first voltage and second voltage lower than the first voltage,
wherein the second scan line is configured to output third voltage and fourth voltage lower than the third voltage,
wherein the second transistor is turned on by the fourth voltage after the second transistor is turned off by the second voltage, and
wherein the third transistor is turned off by the fourth voltage after the second transistor is turned on.

2. The display device according to claim 1, wherein the first to third transistors each include an oxide semiconductor in a channel formation region.

3. The display device according to claim 1, wherein the light-emitting element includes an organic compound layer.

4. A method for driving a display device comprising a display portion and a gate driver,
wherein the display portion includes a plurality of signal lines, a plurality of first scan lines, a plurality of second scan lines, a first pixel circuit, and a second pixel circuit,
wherein the first pixel circuit and the second pixel circuit each include a light-emitting element, a first transistor, a second transistor, a third transistor, and a capacitor,
wherein the gate driver is electrically connected to the plurality of first scan lines and the plurality of second scan lines,
wherein the first scan line is electrically connected to gates of the first transistor and the second transistor included in the first pixel circuit and gates of the first transistor and the second transistor included in the second pixel circuit,
wherein the second scan line is electrically connected to one of a source and a drain of the second transistor included in the first pixel circuit and one of a source and a drain of the second transistor included in the second pixel circuit,
wherein the gate driver is configured to output a first scan signal to the plurality of first scan lines,
wherein the gate driver is configured to output a second scan signal to the plurality of second scan lines,
wherein a first period and a second period are included in one frame period,
wherein in the first period, light emission and gradation of the light-emitting element are controlled, and
wherein in the second period, turning-off of the light-emitting element is controlled.

5. The method for driving a display device according to claim 4, comprising the second period after the first period, wherein the first scan signal is configured to apply fifth voltage and sixth voltage lower than the fifth voltage, wherein the second scan signal is configured to apply seventh voltage and eighth voltage lower than the seventh voltage, wherein in the first period, the fifth voltage is applied by the first scan signal, the signal line inputs a signal to one electrode of the capacitor through the first transistor, the second scan signal applies the seventh voltage to the other electrode of the capacitor through the second transistor, the same voltage as a potential difference applied between the electrodes of the capacitor is applied between a source and a gate of the third transistor, current based on the potential difference is input to the light-emitting element, and light emission and gradation are controlled by input of the current to the light-emitting element, and wherein in the second period, the first transistor and the second transistor are turned off when the sixth voltage is applied to the first scan signal, the second scan signal applies the eighth voltage lower than the sixth voltage, the second transistor is turned on when voltage lower than voltage of the gate of the second transistor is applied to the source of the second transistor, the third transistor is turned off when the eighth voltage is applied to the gate of the third transistor through the second transistor, and a light emission period is controlled by turning off the light-emitting element.

6. A display device comprising a display portion, wherein the display portion includes a first display region, a second display region, a plurality of first scan lines, a plurality of second scan lines, a plurality of third scan lines, and a plurality of pixels, wherein the first display region is configured to display a first image and the second display region is configured to display a second image different from the first image, wherein the first scan line is electrically connected to a pixel included in the first display region so that light is emitted in the first display region, wherein the second scan line is electrically connected to a pixel included in the second display region so that light is emitted in the second display region, wherein the third scan line is electrically connected to the pixel included in the second display region so that the pixel included in the second display region is shut off in response to a signal on the third scan line, wherein the first display region is configured to be controlled to maintain the first image to be displayed and emit light in one frame period, and wherein the second display region is configured to be controlled to maintain the second image to be displayed and select a light emission time in one frame period.

7. The display device according to claim 6, wherein the pixel included in the first display region and the pixel included in the second display region are included in a pixel circuit including a liquid crystal element and a plurality of subpixel circuits each including a light-emitting element, wherein the liquid crystal element is configured to display an image in the first display region, wherein the light-emitting element is configured to display an image in the second display region, and wherein the first display region is formed to surround the second display region.

8. A display module comprising:

the display device according to claim 1; and a touch sensor.

9. An electronic device comprising:

the display module according to claim 8; and an operation key or a battery.

* * * * *